United States Patent
Li et al.

(10) Patent No.: US 11,490,370 B2
(45) Date of Patent: Nov. 1, 2022

(54) INFORMATION TRANSMISSION METHOD AND APPARATUS

(71) Applicant: Huawei Technologies Co., Ltd., Shenzhen (CN)

(72) Inventors: Hua Li, Shanghai (CN); Hao Tang, Shanghai (CN); Liehai Liu, Beijing (CN); Zhenfei Tang, Shanghai (CN); Javad Abdoli, Ottawa (CA); Jinlin Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 16/822,884

(22) Filed: Mar. 18, 2020

(65) Prior Publication Data
US 2020/0280962 A1    Sep. 3, 2020

Related U.S. Application Data

(63) Continuation of application No. PCT/CN2018/102364, filed on Aug. 25, 2018.

(30) Foreign Application Priority Data

Sep. 29, 2017  (CN) .......................... 201710912343.9
May 11, 2018   (CN) .......................... 201810451339.1

(51) Int. Cl.
*H04W 72/04*      (2009.01)
*H04L 5/00*       (2006.01)

(52) U.S. Cl.
CPC ........... *H04W 72/04* (2013.01); *H04L 5/0053* (2013.01); *H04L 5/0055* (2013.01); *H04W 72/0406* (2013.01); *H04W 72/0426* (2013.01)

(58) Field of Classification Search
CPC ............. H04W 72/04; H04W 72/0453; H04W 72/0406; H04W 72/0413; H04W 72/042;
(Continued)

(56) References Cited

U.S. PATENT DOCUMENTS 10,237,039 B2 *  3/2019  Gauvreau ........... H04W 72/082
10,581,579 B2 *  3/2020  Yi ......................... H04L 1/1858
(Continued)

FOREIGN PATENT DOCUMENTS

CN      102948180 A      2/2013
CN      103347298 A      10/2013
(Continued)

OTHER PUBLICATIONS

3GPP TS 36.101 V8.28.0 (Sep. 2017), "3rd Generation Partnership Project; Technical Specification Group Radio Access Network; Evolved Universal Terrestrial Radio Access (E-UTRA); User Equipment (UE) radio transmission and reception (Release 8)," 167 pages.
(Continued)

*Primary Examiner* — Raj Jain
(74) *Attorney, Agent, or Firm* — Slater Matsil, LLP

(57) ABSTRACT

A method includes: sending, by a network device, first information to a terminal, where the first information is used to indicate a location of a channel bandwidth of the terminal, the channel bandwidth is a radio frequency bandwidth, and the radio frequency bandwidth includes an uplink transmission resource or a downlink transmission resource; and receiving, by the terminal, the first information, and determining the location of the channel bandwidth of the terminal based on the first information.

10 Claims, 15 Drawing Sheets

(58) Field of Classification Search
CPC ......... H04W 72/0446; H04W 72/0493; H04W 72/0426; H04L 5/0055
See application file for complete search history.

(56) References Cited

U.S. PATENT DOCUMENTS

| | | | | |
|---|---|---|---|---|
| 10,674,497 | B2* | 6/2020 | Kim | H04W 72/0446 |
| 10,805,907 | B2* | 10/2020 | Lin | H04W 72/0406 |
| 2016/0198471 | A1* | 7/2016 | Young | H04L 67/12 370/329 |
| 2016/0353414 | A1 | 12/2016 | Choi et al. | |
| 2019/0141711 | A1* | 5/2019 | Fu | H04L 5/0053 |
| 2020/0092864 | A1* | 3/2020 | Chen | H04W 72/042 |
| 2020/0280962 | A1* | 9/2020 | Li | H04W 72/0453 |

FOREIGN PATENT DOCUMENTS

| | | |
|---|---|---|
| CN | 103368699 A | 10/2013 |
| EP | 1906689 A1 | 4/2008 |
| EP | 3053387 B1 | 7/2017 |

OTHER PUBLICATIONS

3GPP TS 38.212 V1.0.0 (Sep. 2017), "3rd Generation Partnership Project; Technical Specification Group Radio Access Network; NR; Multiplexing and channel coding (Release 15)," 28 pages.

3GPP TS 38.213 V1.0.0 (Sep. 2017), "3rd Generation Partnership Project; Technical Specification Group Radio Access Network; NR; Physical layer procedures for control (Release 15)," 16 pages.

3GPP TS 38.214 V1.0.0 (Sep. 2017), 3rd Generation Partnership Project; Technical Specification Group Radio Access Network; NR; Physical layer procedures for data (Release 15), 32 pages.

Huawei et al, "Coexistence of different UE types on a wideband carrier," 3GPP TSG RAN WG1 Meeting NR#3; R1-1715570, Nagoya, Japan, Sep. 18-21, 2017, 6 pages.

Huawei et al., "Resource allocation and indication for data channel," 3GPP TSG RAN WG1 Meeting #88bis, R1-1705069, Spokane, USA, Apr. 3-7, 2017, 8 pages.

Intel Corporation, "Timing relationships for DL scheduling," 3GPP TSG RAN WG1 #89, R1-1707403, Hangzhou, P.R. China, May 15-19, 2017, 5 pages.

Nec et al., "WF on UL Resource Allocation for PUSCH with DFT-s-OFDM waveform in NR," 3GPP TSG-RAN WG1 NR Ad-Hoc#2, R1-1711753, Qingdao, P.R. China, Jun. 27-30, 2017, 3 pages.

RAN WGI, "LS on Bandwidth Part Operation in NR," 3GPP TSG RAN WG4 Meeting #84; R4-1707025, Berlin, Germany, Aug. 21-25, 2017, 4 pages.

Samsung, "DL/UL Frequency Resource Allocation," 3GPP TSG RAN WG1 Meeting #90, R1-1713635, Prague, Czechia, Aug. 21-25, 2017, 10 pages.

* cited by examiner

| Band | Downlink | | | Uplink | | |
|---|---|---|---|---|---|---|
| | $F_{DL\_low}$ (MHz) | $N_{Offs\text{-}DL}$ | Range of $N_{DL}$ | $F_{UL\_low}$ (MHz) | $N_{Offs\text{-}UL}$ | Range of $N_{UL}$ |
| 1 | 2110 | 0 | 0–599 | 1920 | 18000 | 18000–18599 |
| 2 | 1930 | 600 | 600–1199 | 1850 | 18600 | 18600–19199 |
| 3 | 1805 | 1200 | 1200–1949 | 1710 | 19200 | 19200–19949 |
| 4 | 2110 | 1950 | 1950–2399 | 1710 | 19950 | 19950–20399 |
| 5 | 869 | 2400 | 2400–2649 | 824 | 20400 | 20400–20649 |
| 6 | 875 | 2650 | 2650–2749 | 830 | 20650 | 20650–20749 |
| 7 | 2620 | 2750 | 2750–3449 | 2500 | 20750 | 20750–21449 |
| 8 | 925 | 3450 | 3450–3799 | 880 | 21450 | 21450–21799 |
| 9 | 1844.9 | 3800 | 3800–4149 | 1749.9 | 21800 | 21800–22149 |
| 10 | 2110 | 4150 | 4150–4749 | 1710 | 22150 | 22150–22749 |
| 11 | 1475.9 | 4750 | 4750–4949 | 1427.9 | 22750 | 22750–22949 |
| 12 | 729 | 5010 | 5010–5179 | 699 | 23010 | 23010–23179 |
| 13 | 746 | 5180 | 5180–5279 | 777 | 23180 | 23180–23279 |
| 14 | 758 | 5280 | 5280–5379 | 788 | 23280 | 23280–23379 |

FIG. 4

INFORMATION TRANSMISSION METHOD AND APPARATUS

CROSS-REFERENCE TO RELATED APPLICATIONS

This application is a continuation of International Application No. PCT/CN2018/102364, filed on Aug. 25, 2018, which claims priority to Chinese Patent Application No. 201710912343.9, filed on Sep. 29, 2017, and claims priority to Chinese Patent Application No. 201810451339.1, filed on May 11, 2018. The disclosures of the aforementioned applications are hereby incorporated by reference in their entireties.

TECHNICAL FIELD

This application relates to the field of communications technologies, and in particular, to an information transmission method and an apparatus.

BACKGROUND

With an increase of mobile subscribers and emergence of large-capacity services (for example, a high-definition video service), introduction of a large bandwidth is a key design in evolution of mobile communications to a 5th generation (5G) mobile communications technology. A larger bandwidth indicates more bandwidth resources used for data transmission and a larger supported traffic volume. 5G may also be referred to as new radio (NR). Therefore, compared with a carrier bandwidth in a long term evolution (LTE) communications system, a carrier bandwidth in NR is increased. However, considering costs of user equipment (UE) and a traffic volume of the UE, a UE-supported bandwidth in an NR communications system may be less than the carrier bandwidth. The UE-supported bandwidth may be referred to as a radio frequency bandwidth of the UE or a channel bandwidth of the UE.

A bandwidth part (BWP) is introduced in a discussion in a 3rd generation partnership project (3GPP) standard conference, and may also be referred to as a carrier bandwidth part. The BWP includes several contiguous resource units in frequency domain, for example, resource blocks (RB). After introduction of the BWP, in a scenario with an increased carrier bandwidth, how to plan a channel bandwidth of UE still requires a further study.

SUMMARY

This application provides an information transmission method and an apparatus, to make a further study on a channel bandwidth of UE after introduction of a BWP in a scenario with an increased carrier bandwidth.

According to a first aspect, an embodiment of this application provides an information transmission method, including sending first information, where the first information is used to indicate a location of a channel bandwidth of a terminal, the channel bandwidth is a radio frequency bandwidth, and the radio frequency bandwidth includes an uplink transmission resource or a downlink transmission resource.

Specifically, an apparatus that sends the first information may be a network device or an apparatus disposed in a network device. The apparatus disposed in the network device may be a chip, a module, a circuit, or the like. This is not specifically limited in this application. Specifically, the network device may send the first information to the terminal.

In the foregoing solution, the network device specifically indicates the location of the channel bandwidth of the terminal to the terminal by using the first information, so that the terminal adjusts the channel bandwidth to the indicated location, and receives data on a corresponding frequency-domain resource. This avoids that reception performance of the terminal is affected because the terminal receives a signal outside a carrier bandwidth.

The first information may be terminal-specific information.

In a possible design, the first information includes an absolute frequency channel number corresponding to a reference frequency in the channel bandwidth of the terminal, and the reference frequency in the channel bandwidth of the terminal is a center frequency in the channel bandwidth of the terminal, the reference frequency in the channel bandwidth of the terminal is a minimum frequency in the channel bandwidth of the terminal, or the reference frequency in the channel bandwidth of the terminal is a maximum frequency in the channel bandwidth of the terminal.

In a possible design, the first information includes an offset of a center frequency in the channel bandwidth of the terminal relative to a location of an upconversion carrier frequency of the terminal.

In a possible design, the offset of the center frequency in the channel bandwidth of the terminal relative to the location of the upconversion carrier frequency of the terminal is $SC_{offset}$ subcarriers, where $SC_{offset}$ is an integer. A subcarrier spacing for the $SC_{offset}$ subcarriers is a minimum subcarrier spacing configured on a carrier, a minimum subcarrier spacing configurable on a carrier, or a preconfigured subcarrier spacing. Alternatively, the method further includes: sending third information, where the third information is used to indicate a subcarrier spacing for the $SC_{offset}$ subcarriers.

In a possible design, the offset of the center frequency in the channel bandwidth of the terminal relative to the location of the upconversion carrier frequency of the terminal is $Rs_{offset}$ global frequency rasters or $Rs_{offset}$ channel rasters, where $Rs_{offset}$ is an integer.

In a possible design, the first information includes an offset of a center frequency in the channel bandwidth of the terminal relative to a center subcarrier in a resource grid.

In a possible design, the offset of the center frequency in the channel bandwidth of the terminal relative to the center subcarrier in the resource grid is $Rs_{offset}^{RB}$ global frequency rasters or $Rs_{offset}^{RB}$ channel rasters, where $Rs_{offset}^{RB}$ is an integer.

In a possible design, the offset of the center frequency in the channel bandwidth of the terminal relative to the center subcarrier in the resource grid is $SC_{offset}^{RB}$ subcarriers, where $SC_{offset}^{RB}$ is an integer, and a subcarrier spacing corresponding to the $SC_{offset}^{RB}$ subcarriers is a subcarrier spacing corresponding to the resource grid. The subcarrier spacing corresponding to the resource grid is a minimum subcarrier spacing configured on a carrier, a minimum subcarrier spacing configurable on a carrier, or a preconfigured subcarrier spacing. Alternatively, the method further includes: sending fourth information, where the fourth information is used to indicate the subcarrier spacing for the resource grid.

In the foregoing solution, when configuring a BWP or configuring the channel bandwidth of the terminal for a BWP, the network device can flexibly adjust the location of the channel bandwidth of the terminal, to prevent the channel bandwidth of the terminal from falling outside a carrier bandwidth, thereby avoiding interference to reception of the terminal.

In a possible design, that the first information is used to indicate a location of a channel bandwidth of a terminal includes: one piece of the first information is used to indicate a location of one channel bandwidth of the terminal, and the one channel bandwidth is corresponding to one bandwidth part BWP for the terminal; and the one BWP for the terminal includes some contiguous frequency-domain resources in a carrier bandwidth.

In a possible design, the first information may include an offset of the nth resource unit in the channel bandwidth of the terminal relative to a reference resource unit in frequency domain, where n is a positive integer less than or equal to M, and M is a quantity of resource units in the channel bandwidth of the terminal; and the reference resource unit is a predefined resource unit or a reference point of a BWP for the terminal, and the BWP for the terminal includes some contiguous frequency-domain resources in a carrier bandwidth.

In the foregoing design, when configuring a BWP or configuring the channel bandwidth of the terminal for a BWP, the network device uses the offset relative to the reference resource unit to indicate the location of the channel bandwidth of the terminal. This can flexibly adjust the location of the channel bandwidth of the terminal, to prevent the channel bandwidth of the terminal from falling outside the carrier bandwidth, thereby avoiding interference to reception of the terminal.

In a possible design, n is equal to 1, to be specific, the first information includes an offset of an edge PRB on a lower boundary of the channel bandwidth of the terminal relative to the reference resource unit in frequency domain; n is equal to M, to be specific, the first information includes an offset of an edge PRB on an upper boundary of the channel bandwidth of the terminal relative to the reference resource unit in frequency domain; or if M is an even number, n is equal to M/2 or M/2+1, or if M is an odd number, n is equal to (N+1)/2, to be specific, the first information includes an offset of a center PRB in the channel bandwidth of the terminal relative to the reference resource unit in frequency domain.

In a possible design, the reference resource unit is the qth resource unit in the BWP for the terminal, where q is a positive integer and an integer less than or equal to Q, and Q is a quantity of resource units in the BWP for the terminal. To be specific, the first information may include an offset of the nth resource unit in the channel bandwidth of the terminal relative to the qth resource unit in the BWP for the terminal in frequency domain.

Optionally, q is equal to 1; q is equal to Q; if Q is an even number, q is equal to Q/2 or Q/2+1; or if Q is an odd number, q is equal to (Q+1)/2.

In the foregoing design, the network device uses an offset of the location of the channel bandwidth of the terminal relative to a location of the BWP to indicate the location of the channel bandwidth of the terminal. This ensures that the channel bandwidth of the terminal falls within a carrier bandwidth, thereby avoiding interference to reception of the terminal.

In a possible design, the first information is used to indicate that the first resource unit in the channel bandwidth of the terminal is the same as the first resource unit in a BWP for the terminal, the $X^{th}$ resource unit in the channel bandwidth of the terminal is the same as the $Y^{th}$ resource unit in a BWP for the terminal, or the $i^{th}$ resource unit in the channel bandwidth of the terminal is the same as the $j^{th}$ resource unit in a BWP for the terminal, where X is equal to a quantity of resource units in the channel bandwidth of the terminal, and Y is equal to a quantity of resource units in the BWP for the terminal; if X is an even number, i is equal to X/2 or X/2+1, or if X is an odd number, i is equal to (X+1)/2; if Y is an even number, j is equal to Y/2 or Y/2+1, or if Y is an odd number, j is equal to (Y+1)/2; and the BWP for the terminal includes some contiguous frequency-domain resources in a carrier bandwidth.

In the foregoing design, several relative location relationships between a BWP and a channel bandwidth of the terminal are predefined. The network device may indicate a location relationship between a BWP and a channel bandwidth of the terminal to the terminal, to ensure that the channel bandwidth of the terminal falls within a carrier bandwidth, thereby avoiding interference to reception of the terminal.

In this application, in one manner, a value of the channel bandwidth of the terminal may be predefined. In another manner, a network device side configures a value of the channel bandwidth of the terminal for the terminal. Specifically, the network device may further send second information to the terminal. The second information is used to indicate the value of the channel bandwidth of the terminal. The network device side may add the first information and the second information to same signaling, and send the signaling to the terminal, or may add the first information and the second information to different signaling, and send the signaling to the terminal. In still another manner, a value of the channel bandwidth of the terminal is determined based on a configured correspondence and a bandwidth value of a BWP. Specifically, the terminal receives configuration information of the BWP, where the configuration information of the BWP includes the bandwidth value of the BWP. The terminal determines, based on the configured correspondence and the bandwidth value of the BWP, the value of the channel bandwidth, of the terminal, corresponding to the BWP, where the configured correspondence is a correspondence between a value of a channel bandwidth of the terminal and a value of a terminal-side transmission configuration bandwidth, a value that is of a terminal-side transmission configuration bandwidth and that is corresponding to a value of one channel bandwidth is a quantity of resource units that can be used for data transmission in the one channel bandwidth, the value of the channel bandwidth of the terminal is equal to a value of a first channel bandwidth, the value of the first channel bandwidth is equal to a minimum value in a first set, and each value that is of a terminal-side transmission configuration bandwidth and that is included in the first set is greater than or equal to the bandwidth value of the BWP.

In the foregoing design, for different terminals, values of channel bandwidths, of the terminals, corresponding to different BWPs may be configured as required, thereby improving application flexibility of a BWP configuration.

According to a second aspect, an embodiment of this application further provides an information transmission method, where the method includes: receiving first information, and determining a location of a channel bandwidth of the terminal based on the first information, where the first information is used to indicate the location of the channel bandwidth of the terminal, the channel bandwidth is a radio frequency bandwidth, and the radio frequency bandwidth includes an uplink transmission resource or a downlink transmission resource. An entity that receives the first information may be a terminal or an apparatus disposed in a terminal. The apparatus disposed in the terminal may be a chip, a module, or a circuit. This is not specifically limited in this application.

In a possible design, for specific content included in the first information, refer to the specific descriptions of the first information in the first aspect. This is not specifically limited herein.

In a possible design, the method may further include: receiving second information, where the second information is used to indicate a value of the channel bandwidth of the terminal, so that the terminal can determine the value of the channel bandwidth of the terminal based on the second information.

In a possible design, the method may further include: receiving third information, where the third information is used to indicate a subcarrier spacing corresponding to the $SC_{offset}$ subcarriers.

In a possible design, the method may further include: receiving fourth information, where the fourth information is used to indicate a subcarrier spacing for the resource grid.

In a possible design, the method may further include: receiving configuration information of a BWP, where the configuration information of the BWP includes a bandwidth value of the BWP; and determining, based on a configured correspondence and the bandwidth value of the BWP, the value of the channel bandwidth, of the terminal, corresponding to the BWP, where the configured correspondence is a correspondence between a value of a channel bandwidth of the terminal and a value of a terminal-side transmission configuration bandwidth, the value of the channel bandwidth of the terminal is equal to a value of a first channel bandwidth, the first channel bandwidth is corresponding to a minimum value in a first set, and each value that is of a terminal-side transmission configuration bandwidth and that is included in the first set is greater than or equal to the bandwidth value of the BWP.

Based on an embodiment of the first aspect, according to a third aspect, an embodiment of this application provides an apparatus. The apparatus may be a network device or an apparatus in a network device. The apparatus may include a generation module and a sending module. The modules may perform corresponding functions performed by the network device in any design example of the first aspect. Details are as follows:

The generation module is configured to generate first information.

The sending module is configured to send the first information, where the first information is used to indicate a location of a channel bandwidth of a terminal, the channel bandwidth is a radio frequency bandwidth, and the radio frequency bandwidth includes an uplink transmission resource or a downlink transmission resource.

In a possible design, for specific content included in the first information, refer to the specific descriptions of the first information in the first aspect. This is not specifically limited herein.

In a possible design, the sending module is further configured to send second information, where the second information is used to indicate a value of the channel bandwidth of the terminal.

In a possible design, the sending module is further configured to send third information, where the third information is used to indicate a subcarrier spacing corresponding to the $SC_{offset}$ subcarriers.

In a possible design, the sending module is further configured to send fourth information, where the fourth information is used to indicate a subcarrier spacing for the resource grid.

According to a fourth aspect, an embodiment of this application further provides a network device. The network device includes a processor, configured to implement functions of the network device in the method described in the first aspect. The network device may further include a memory, configured to store a program instruction and data. The memory is coupled to the processor. The processor may invoke and execute the program instruction stored in the memory, to implement the functions of the network device in the method described in the first aspect. The network device may further include a transceiver, and the transceiver is used for communication between the network device and another device. For example, the another device is a terminal.

In a possible design, the network device includes: the transceiver; the memory, configured to store the program instruction; and the processor, configured to: generate first information, and send the first information by using the transceiver, where the first information is used to indicate a location of a channel bandwidth of a terminal, the channel bandwidth is a radio frequency bandwidth, and the radio frequency bandwidth includes an uplink transmission resource or a downlink transmission resource.

In a possible design, for specific content included in the first information, refer to the specific descriptions of the first information in the first aspect. This is not specifically limited herein.

In a possible design, the processor is further configured to send second information by using the transceiver, where the second information is used to indicate a value of the channel bandwidth of the terminal.

In a possible design, the processor is further configured to send third information by using the transceiver, where the third information is used to indicate a subcarrier spacing corresponding to the $SC_{offset}$ subcarriers.

In a possible design, the processor is further configured to send fourth information by using the transceiver, where the fourth information is used to indicate a subcarrier spacing for the resource grid.

Based on an embodiment of the second aspect, according to a fifth aspect, an embodiment of this application provides an apparatus. The apparatus may be a terminal or an apparatus in a terminal. The apparatus includes a receiving module and a determining module. The modules may perform corresponding functions of the terminal in any design example of the first aspect. Details are as follows:

The receiving module is configured to receive first information, where the first information is used to indicate a location of a channel bandwidth of the terminal, the channel bandwidth is a radio frequency bandwidth, and the radio frequency bandwidth includes an uplink transmission resource or a downlink transmission resource.

The determining module is configured to determine the location of the channel bandwidth of the terminal based on the first information.

In a possible design, for specific content included in the first information, refer to the specific descriptions of the first information in the second aspect. This is not specifically limited herein.

In a possible design, the receiving module is further configured to receive second information, where the second information is used to indicate a value of the channel bandwidth of the terminal.

In a possible design, the receiving module is further configured to receive third information, where the third information is used to indicate a subcarrier spacing corresponding to the $SC_{offset}$ subcarriers.

In a possible design, the receiving module is further configured to receive fourth information, where the fourth information is used to indicate a subcarrier spacing for the resource grid.

In a possible design, the receiving module is further configured to receive configuration information of a BWP, where the configuration information of the BWP includes a bandwidth value of the BWP. The determining module is further configured to determine, based on a configured correspondence and the bandwidth value of the BWP, the value of the channel bandwidth, of the terminal, corresponding to the BWP, where the configured correspondence is a correspondence between a value of a channel bandwidth of the terminal and a value of a terminal-side transmission configuration bandwidth, the value of the channel bandwidth of the terminal is equal to a value of a first channel bandwidth, the first channel bandwidth is corresponding to a minimum value in a first set, and each value that is of a terminal-side transmission configuration bandwidth and that is included in the first set is greater than or equal to the bandwidth value of the BWP.

According to a sixth aspect, an embodiment of this application further provides a terminal. The terminal includes a processor, configured to implement functions of the terminal in the method described in the second aspect. The terminal may further include a memory, configured to store a program instruction and data. The memory is coupled to the processor. The processor invokes and executes the program instruction stored in the memory, to implement the functions of the terminal in the method described in the second aspect. The terminal may further include a transceiver, and the transceiver is used for communication between the terminal and another device. For example, the another device is a network device.

In a possible design, the terminal includes: the transceiver; the memory, configured to store the program instruction; and the processor, configured to: receive first information by using the transceiver, where the first information is used to indicate a location of a channel bandwidth of the terminal, the channel bandwidth is a radio frequency bandwidth, and the radio frequency bandwidth includes an uplink transmission resource or a downlink transmission resource; and the processor determines the location of the channel bandwidth of the terminal based on the first information.

In a possible design, for specific content included in the first information, refer to the specific descriptions of the first information in the second aspect. This is not specifically limited herein.

In a possible design, the processor is further configured to: receive second information by using the transceiver, where the second information is used to indicate a value of the channel bandwidth of the terminal; and determine the value of the channel bandwidth of the terminal based on the second information.

In a possible design, the processor is further configured to receive third information by using the transceiver, where the third information is used to indicate a subcarrier spacing corresponding to the $SC_{offset}$ subcarriers.

In a possible design, the processor is further configured to receive fourth information by using the transceiver, where the fourth information is used to indicate a subcarrier spacing for the resource grid.

In a possible design, the processor is further configured to: receive configuration information of a BWP by using the transceiver, where the configuration information of the BWP includes a bandwidth value of the BWP; and determine, based on a configured correspondence and the bandwidth value of the BWP, the value of the channel bandwidth, of the terminal, corresponding to the BWP, where the configured correspondence is a correspondence between a value of a channel bandwidth of the terminal and a value of a terminal-side transmission configuration bandwidth, the value of the channel bandwidth of the terminal is equal to a value of a first channel bandwidth, the first channel bandwidth is corresponding to a minimum value in a first set, and each value that is of a terminal-side transmission configuration bandwidth and that is included in the first set is greater than or equal to the bandwidth value of the BWP.

According to a fourteenth aspect, an embodiment of this application provides a data transmission method, including: performing data transmission with a terminal by using a resource in a channel bandwidth of the terminal, where a center frequency in the channel bandwidth of the terminal is aligned with a center subcarrier in a resource grid.

In a possible design, if a resource grid size corresponding to a minimum subcarrier spacing is the same as a maximum transmission bandwidth configuration corresponding to the minimum subcarrier spacing, a subcarrier spacing corresponding to the resource grid is the minimum subcarrier spacing. The minimum subcarrier spacing is a minimum subcarrier spacing configured on a carrier or a minimum subcarrier spacing configurable on a carrier.

In a possible design, if a resource grid size corresponding to a minimum subcarrier spacing is different from a maximum transmission bandwidth configuration corresponding to the minimum subcarrier spacing, a subcarrier spacing corresponding to the resource grid is a first subcarrier spacing. A product of the first subcarrier spacing and a resource grid size corresponding to the first subcarrier spacing is greater than or equal to a product of a second subcarrier spacing and a resource grid size corresponding to the second subcarrier spacing, and the second subcarrier spacing and the first subcarrier spacing are subcarrier spacings configured on a carrier, or the second subcarrier spacing and the first subcarrier spacing are subcarrier spacings configurable on a carrier.

In a possible design, if a resource grid size corresponding to a maximum subcarrier spacing is the same as a maximum transmission bandwidth configuration corresponding to the maximum subcarrier spacing, a subcarrier spacing corresponding to the resource grid is the maximum subcarrier spacing. The maximum subcarrier spacing is a maximum subcarrier spacing configured on a carrier or a maximum subcarrier spacing configurable on a carrier.

In a possible design, if a resource grid size corresponding to a maximum subcarrier spacing is different from a maximum transmission bandwidth configuration corresponding to the maximum subcarrier spacing, a subcarrier spacing corresponding to the resource grid is a first subcarrier spacing. A product of the first subcarrier spacing and a resource grid size corresponding to the first subcarrier spacing is greater than or equal to a product of a second subcarrier spacing and a resource grid size corresponding to the second subcarrier spacing, and the second subcarrier spacing and the first subcarrier spacing are subcarrier spacings configured on a carrier, or the second subcarrier spacing and the first subcarrier spacing are subcarrier spacings configurable on a carrier.

In a possible configuration, the subcarrier spacing corresponding to the resource grid is the minimum subcarrier spacing configured on the carrier or the minimum subcarrier spacing configurable on the carrier; or the subcarrier spacing corresponding to the resource grid is the maximum subcarrier spacing configured on the carrier or the maximum subcarrier spacing configurable on the carrier. Alternatively, the subcarrier spacing corresponding to the resource grid is a preconfigured subcarrier spacing. Alternatively, the method further includes: sending fifth information, where the fifth information is used to indicate the subcarrier spacing for the resource grid.

An apparatus that performs the method in the fourteenth aspect may be a network device or an apparatus capable of supporting a network device in implementing the method. For example, the apparatus may be a chip, a module, a circuit, or the like. This is not specifically limited in this application.

According to a fifteenth aspect, an embodiment of this application provides a data transmission method, including: determining that a center frequency in a channel bandwidth of a terminal is aligned with a center subcarrier in a resource grid, and performing data transmission by using a resource in the channel bandwidth of the terminal.

In a possible design, for specific content of the resource grid, refer to the corresponding descriptions in the fourteenth aspect. Details are not described herein again.

In a possible design, the method further includes: receiving fifth information, where the fifth information is used to indicate the subcarrier spacing for the resource grid.

An apparatus that performs the method in the fifteenth aspect may be a terminal or an apparatus capable of supporting a terminal in implementing the method. For example, the apparatus may be a chip, a module, a circuit, or the like. This is not specifically limited in this application.

Based on an embodiment of the fourteenth aspect, according to a sixteenth aspect, an embodiment of this application provides an apparatus. The apparatus may be a network device or an apparatus capable of supporting a network device in implementing the method in the fourteenth aspect. The apparatus may include a communications module that can perform functions in any design example of the fourteenth aspect. Details are as follows.

The communications module is configured to: perform data transmission with a terminal by using a resource in a channel bandwidth of the terminal, where a center frequency in the channel bandwidth of the terminal is aligned with a center subcarrier in a resource grid.

In a possible design, for specific content of the resource grid, refer to the corresponding descriptions in the fourteenth aspect. Details are not described herein again.

In a possible design, the communications module is further configured to send fifth information, where the fifth information is used to indicate the subcarrier spacing for the resource grid.

According to a seventeenth aspect, an embodiment of this application further provides a network device. The network device includes a processor, configured to implement functions of the network device in the method described in the fourteenth aspect. The network device may further include a memory, configured to store a program instruction and data. The memory is coupled to the processor. The processor may invoke and execute the program instruction stored in the memory, to implement the functions of the network device in the method described in the fourteenth aspect. The network device may further include a transceiver, and the transceiver is used for communication between the network device and another device. For example, the another device is a terminal.

In a possible design, the network device includes: the transceiver; the memory, configured to store the program instruction; and the processor, configured to: perform data transmission with a terminal by using the transceiver on a resource in a channel bandwidth of the terminal, where a center frequency in the channel bandwidth of the terminal is aligned with a center subcarrier in a resource grid.

In a possible design, for specific content of the resource grid, refer to the corresponding descriptions in the fourteenth aspect. Details are not described herein again.

In a possible design, the processor is further configured to send fifth information by using the transceiver, where the fifth information is used to indicate the subcarrier spacing for the resource grid.

Based on an embodiment of the fifteenth aspect, according to an eighteenth aspect, an embodiment of this application provides an apparatus. The apparatus may be a terminal or an apparatus capable of supporting a terminal in implementing the method in the fifteenth aspect. The apparatus may include a communications module that can perform functions in any design example of the fifteenth aspect. Details are as follows.

The communications module is configured to: perform data transmission by using a resource in a channel bandwidth of the terminal, where a center frequency in the channel bandwidth of the terminal is aligned with a center subcarrier in a resource grid.

In a possible design, for specific content of the resource grid, refer to the corresponding descriptions in the fifteenth aspect. Details are not described herein again.

In a possible design, the communications module is further configured to receive fifth information, where the fifth information is used to indicate the subcarrier spacing for the resource grid.

According to a nineteenth aspect, an embodiment of this application further provides a terminal. The terminal includes a processor, configured to implement functions of the terminal in the method described in the fifteenth aspect. The terminal may further include a memory, configured to store a program instruction and data. The memory is coupled to the processor. The processor invokes and executes the program instruction stored in the memory, to implement the functions of the terminal in the method described in the fifteenth aspect. The terminal may further include a transceiver, and the transceiver is used for communication between the terminal and another device. For example, the another device is a network device.

In a possible design, the terminal includes the transceiver; the memory, configured to store the program instruction; and the processor, configured to: perform data transmission by using the transceiver on a resource in a channel bandwidth of the terminal, where a center frequency in the channel bandwidth of the terminal is aligned with a center subcarrier in a resource grid.

In a possible design, for specific content of the resource grid, refer to the corresponding descriptions in the fifteenth aspect. Details are not described herein again.

In a possible design, the processor further receives fifth information by using the transceiver, where the fifth information is used to indicate the subcarrier spacing for the resource grid.

According to a seventh aspect, an embodiment of this application further provides a computer storage medium, where the storage medium stores a program instruction, and when the program instruction is read and executed by one or more processors, the method described in the first aspect or the fourteenth aspect can be implemented.

According to an eighth aspect, an embodiment of this application further provides a computer storage medium, where the storage medium stores a software program, and when the software program is read and executed by one or more processors, the method described in the second aspect or the fifteenth aspect can be implemented.

According to a ninth aspect, an embodiment of this application provides a computer program product including an instruction, and when the computer program product runs on a computer, the computer performs the method described in the first aspect or the fourteenth aspect.

According to a tenth aspect, an embodiment of this application provides a computer program product including an instruction, and when the computer program product runs on a computer, the computer performs the method described in the second aspect or the fifteenth aspect.

According to an eleventh aspect, an embodiment of this application provides a chip system, where the chip system includes a processor, and may further include a memory, which are configured to implement functions of the network device in the foregoing methods. The chip system may include a chip, or may include a chip and another discrete device.

According to a twelfth aspect, an embodiment of this application provides a chip system, where the chip system includes a processor, and may further include a memory, which are configured to implement functions of the terminal in the foregoing methods. The chip system may include a chip, or may include a chip and another discrete device.

According to a thirteenth aspect, an embodiment of this application provides a system, where the system includes the network device described in the third aspect or the fourth aspect and the terminal described in the fifth aspect or the sixth aspect; or the system includes the network device described in the sixteenth aspect or the seventeenth aspect and the terminal described in the eighteenth aspect or the nineteenth aspect.

BRIEF DESCRIPTION OF THE DRAWINGS

FIG. 4 is a schematic diagram of division of absolute frequency channel numbers according to an embodiment of this application;

DETAILED DESCRIPTION OF ILLUSTRATIVE EMBODIMENTS

Figure 1:
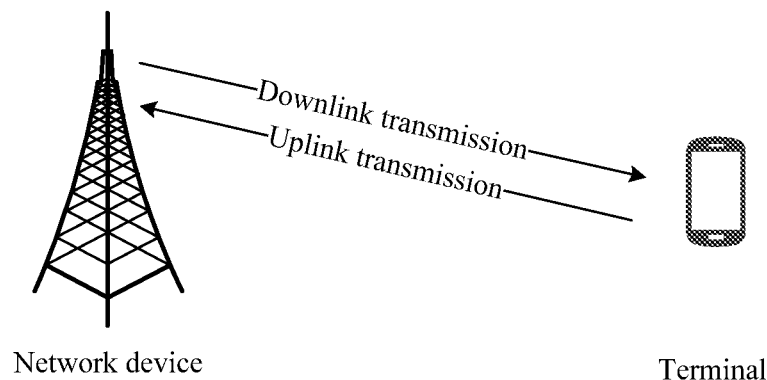
FIG. 1 is a schematic structural diagram of a communications system according to an embodiment of this application.

[oils] Embodiments of this application may be applied to, but not limited to, an NR system, may also be applied to a communications system such as an LTE system, a long term evolution-advanced (LTE-A) system, or an enhanced long term evolution (eLTE) system, and may also be extended to a related cellular system such as wireless fidelity (Wi-Fi), worldwide interoperability for microwave access (WiMAX), or 3GPP. Specifically, an architecture of the communications system to which the embodiments of this application are applied may be shown in FIG. 1, and includes a network device and at least one terminal. It should be noted that a quantity of terminals in the communications system shown in FIG. 1 is not limited in the embodiments of this application.

The following describes some terms in this application according to some embodiments.

(1) Network device: is a device that connects a terminal to a wireless network in a communications system. The network device is a node in a radio access network, and may also be referred to as a base station or a radio access network (RAN) node (or device). Currently, some network devices are, for example, a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), and a wireless fidelity (Wi-Fi) access point (AP). In addition, in a network structure, the network device may include a centralized unit (CU) node and a distributed unit (DU) node. In this structure, a protocol layer of an eNB in a long term evolution (LTE) system is split. Some functions of the protocol layer are controlled by a CU in a centralized manner, all or some of remaining functions of the protocol layer are distributed in a DU, and the CU controls the DU in a centralized manner.

(2) Terminal: is also referred to as a terminal device, user equipment (user equipment, UE), a mobile station (MS), a mobile terminal (MT), or the like, and is a device that provides a user with voice and/or data connectivity, for example, a handheld device or an in-vehicle device with a wireless connection function. Currently, some terminals are, for example, a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, and a wireless terminal in a smart home.

(3) Resource unit: is a resource allocation granularity, for example, an RB. It should be noted that a range of the resource unit in time domain is not limited in this application. The resource unit may be a physical resource unit or a virtual resource unit. The virtual resource unit is a logical concept of a frequency-domain resource, and a size (in frequency domain and in time domain) of the virtual resource unit is the same as that of a physical resource unit to which the virtual resource unit is mapped. In a communications system, a network device may indicate allocation information of a physical resource unit to a terminal based on a mapping relationship between a virtual resource unit and a physical resource unit.

In the embodiments of this application, the physical resource unit may be a physical resource block (PRB), and the PRB may be a PRB defined in an NR protocol and may include 12 contiguous subcarriers in frequency domain. The virtual resource unit may be a virtual resource block (VRB), and a virtual resource unit number may be mapped to another physical resource unit number.

In the embodiments of this application, the physical resource unit may alternatively be a physical resource block group (PRBG). One PRBG may include a plurality of contiguous PRBs in frequency domain and have a number n_PRBG. The virtual resource unit may be a virtual resource block group (VRBG) with a number n_VRBG, and a virtual resource unit number may be mapped to another physical resource unit number.

(4) Bandwidth Part:

Currently, a BWP is introduced in a discussion in a 3GPP standard conference. The BWP is a segment of frequency-domain resource that includes contiguous physical resource units (for example, PRBs) and that is configured by a network device for a terminal in a communications system. The bandwidth part used by the terminal is within a system bandwidth range of the communications system, and a bandwidth of the bandwidth part used by the terminal needs to be less than or equal to a maximum bandwidth supported by the terminal (which may also be referred to as a radio frequency bandwidth of the terminal). Therefore, a value of the bandwidth of the BWP configured by the network device for the terminal cannot exceed the radio frequency bandwidth of the terminal. For example, if the radio frequency bandwidth of the terminal is 50 MHz, the value of the bandwidth of the BWP configured for the terminal cannot exceed a quantity of RBs included in 50 MHz. The bandwidth part may be a downlink bandwidth part or an uplink bandwidth part. The terminal receives or sends data on a data channel in the bandwidth part. The network device may configure one or more downlink or uplink bandwidth parts for the terminal. The terminal may simultaneously work in one or more bandwidth parts (including a plurality of downlink bandwidth parts or a plurality of uplink bandwidth parts). The network device configures, for the terminal in the BWP, a frequency-domain resource used for data transmission. The BWP is measured in a form of resource units.

Figure 2:
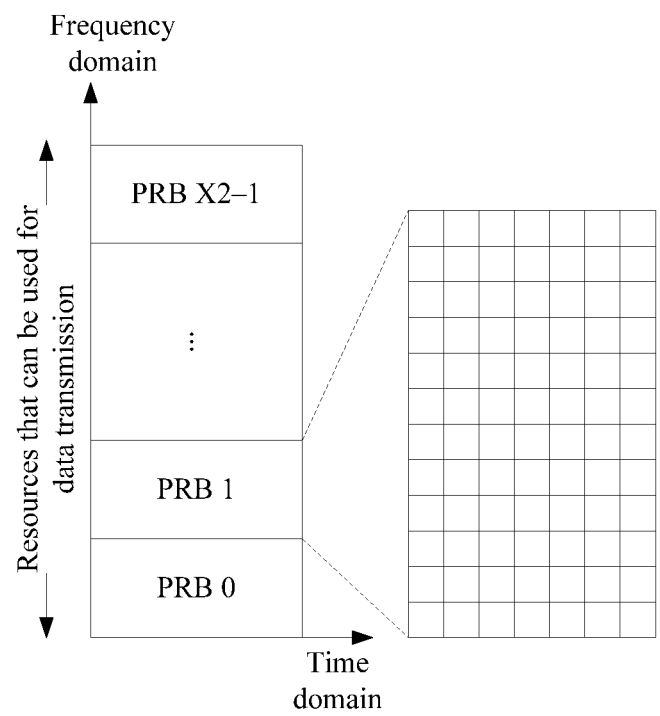
FIG. 2 is a schematic structural diagram of a bandwidth of a resource that can be used for data transmission according to an embodiment of this application.

In a wireless communications system, for example, in an orthogonal frequency division multiplexing (OFDM)-based communications system, a resource that can be used for data transmission includes a plurality of resource grids in frequency domain. One resource grid is corresponding to one subcarrier, and one PRB includes X1 resource grids, where X1 is an integer greater than 1. For example, X1 is 12. The resource that can be used for data transmission may be some or all resources in a system bandwidth, or may be some or all resources in a BWP. A bandwidth of the resource that can be used for data transmission may be referred to as X2 PRBs, where X2 is an integer greater than or equal to 1. For the PRBs in the resource that can be used for data transmission, the PRBs may be sequentially numbered 0 to X2−1 in a frequency increase direction, to obtain PRB numbers. In the embodiments of this application, the term "number" may also be referred to as an "identifier" or an "index". In time domain, one PRB may include X3 symbols, where X3 is an integer greater than or equal to 1. For example, X3 is 7 or 14. That one PRB includes 12 resource grids in frequency domain and includes seven symbols in time domain is used as an example. FIG. 2 is a schematic structural diagram of a bandwidth of a resource that can be used for data transmission. The bandwidth of the resource that can be used for data transmission includes a total of X2 PRBs: a PRB 0 to a PRB X2−1.

For different subcarrier spacings, a same quantity or different quantities of subcarriers may be configured in PRBs corresponding to the different subcarrier spacings. This is not limited in this application. For one BWP, a bandwidth of a PRB in the BWP is determined based on a subcarrier spacing of the BWP and a quantity of subcarriers in the PRB. For example, for one BWP, if a subcarrier spacing of the BWP is 15 kHz, and one PRB includes 12 subcarriers, a bandwidth of the PRB in the BWP is 180 kHz. For another example, for one BWP, if a subcarrier spacing of the BWP is 60 kHz, and one PRB includes 12 subcarriers, a bandwidth of the PRB in the BWP is 720 kHz.

Figure 3:
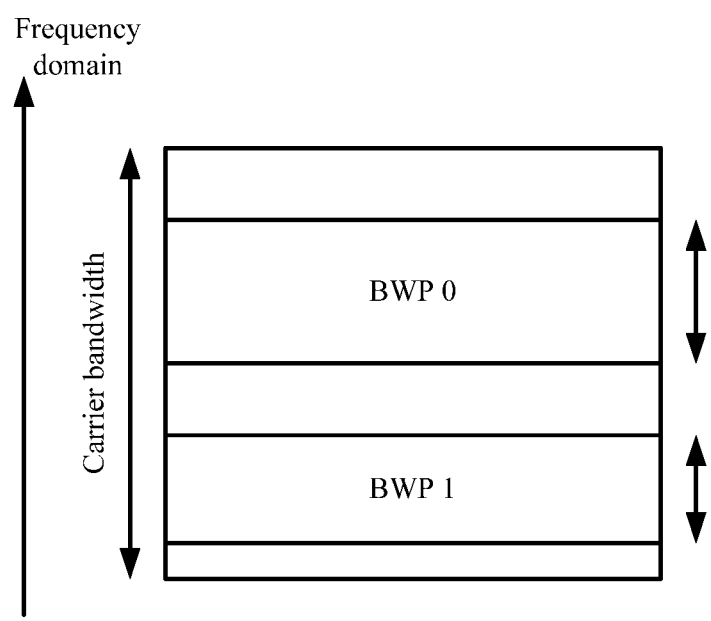
FIG. 3 is a schematic structural diagram of a BWP according to an embodiment of this application.

The network device may configure a BWP for the terminal in a system bandwidth. A value of a bandwidth of the BWP is less than or equal to a bandwidth capacity of the terminal, in other words, the value of the bandwidth of the BWP is less than or equal to a channel bandwidth of the terminal. When the terminal communicates with the network device, the network device may allocate, to the terminal, some or all resources in the BWP configured for the terminal, to perform communication between the network device and the terminal. Referring to FIG. 3, two BWPs: a BWP 0 and a BWP 1, are configured for the terminal.

(5) A configured frequency range in the embodiments of this application includes all usable frequency resources specified by a communications protocol. An absolute frequency channel number in the embodiments of this application is obtained through numbering after the configured frequency range is divided at a specified granularity. The specified granularity may be a channel raster.

A size of a channel raster may be predefined. For example, a size of one channel raster is 100 kHz, may be a size of one PRB, may be a size of one subcarrier, or the like. For example, when the size of the channel raster is 100 kHz, absolute frequency channel numbers (absolute radio frequency channel number, ARFCN) obtained through numbering after all the usable frequency resources specified by the current communications protocol are classified based on the channel raster range from 0 to 65535. A carrier frequency corresponding to the absolute frequency channel number is not specifically limited in the embodiments of this application. In an example, FIG. 4 shows carrier frequencies (or referred to as center carrier frequencies) corresponding to ARFCNs ranging from 1 to 5739 in downlink and carrier frequencies corresponding to ARFCNs ranging from 18000 to 23379 in uplink. In the downlink, a correspondence between a carrier frequency and an ARFCN meets a condition shown in the following formula (1), and in the uplink, a correspondence between a carrier frequency and an ARFCN meets a condition shown in the following formula (2):

$$F_{DL}=F_{DL\_low}+0.1(N_{DL}-N_{offs\_DL}) \quad \text{Formula (1)}$$

$$F_{UL}=F_{UL\_low}+0.1(N_{UL}-N_{offs\_UL}) \quad \text{Formula (2)}$$

$F_{DL}$ represents a downlink carrier frequency (which is also a minimum frequency, of a channel raster, corresponding to an ARFCN), $F_{UL}$ represents an uplink carrier frequency, $N_{DL}$ represents a downlink ARFCN, $N_{UL}$ represents an uplink ARFCN, $N_{offs\_DL}$ represents an offset used to determine the downlink ARFCN, $N_{offs\_UL}$ represents an offset used to determine the uplink ARFCN, $F_{DL\_low}$ represents a lowest frequency in a downlink band, and $F_{UL\_low}$ represents a lowest frequency in an uplink band.

The band is a spectrum width or a frequency range and is measured by Hz. For example, the communications protocol may specify that all the usable frequency resources may be classified into 70 bands, and numbers 1 to 70 are used to indicate different bands. FIG. 4 shows a correspondence between carrier frequencies (center carrier frequencies) corresponding to bands 1 to 14 and absolute frequency channel numbers. Different operators may use different bands, or use different frequency ranges in a same band. A band division manner in the current communications protocol is applicable to the embodiments of this application, and certainly, band division may be performed in other different manners. This is not specifically limited in the embodiments of this application.

For example, Table 1 shows a manner of classifying absolute frequency channel numbers.

TABLE 1

| band | $F_{low}$ | $N_{offs}$ | $N_{AR}$ |
|------|-----------|------------|----------|
| i    | a         | b          | ARFCN o-ARFCN n |

$F_{low}$ represents a lower boundary frequency (a minimum frequency) in a band, $N_{offs}$ represents an offset used to determine an ARFCN, $N_{AR}$ represents an ARFCN range, and ARFCNs in the $i^{th}$ band range from an ARFCN 0 to an ARFCN n. In this case, it is determined that a correspondence between a carrier frequency and an ARFCN meets a condition shown in the following formula (3):

$$F_L=F_{low}+C\times(N_{AR}-N_{offs}) \quad \text{Formula (3),}$$

where $F_L$ represents a carrier frequency, and C represents a channel raster size.

The absolute frequency channel number in the embodiments of this application may alternatively be determined based on a global frequency raster. For descriptions of the global frequency raster, refer to descriptions in the 3GPP protocol specification TS 38.101. A frequency range corresponding to the global frequency raster may be from 0 GHz to 100 GHz, and is used to define an allowed set of radio frequency reference frequencies. For descriptions of the radio frequency reference frequency, refer to descriptions in the 3GPP protocol specification TS 38.101. A granularity of the global frequency raster is $\Delta F_{Global}$. In a band, a subset of the global frequency raster may be used as a channel raster of the band. Assuming that a granularity of the channel raster is $\Delta F_{Raster}$, the granularity of the channel raster may be greater than or equal to the granularity of the global frequency raster.

For example, an ARFCN value corresponding to the global frequency raster is an integer between 0 and 2016666. A relationship between a radio frequency reference frequency and an ARFCN corresponding to the global frequency raster is as follows:

$$F_{REF}=F_{REF\text{-}Offs}+\Delta F_{Global}(N_{REF}-N_{REF\text{-}Offs}),$$

where $F_{REF}$ represents the radio frequency reference frequency, $N_{REF}$ represents the ARFCN corresponding to the global frequency raster, and $F_{REF\text{-}Offs}$ and $N_{REF\text{-}Offs}$ are integers. For example, a frequency range of $F_{REF}$, $\Delta F_{Global}$, a value range of $N_{REF}$, a value of $F_{REF\text{-}Offs}$, and a value of $N_{REF\text{-}Offs}$ may be shown in the following Table 3:

TABLE 3

| Frequency range of $F_{REF}$ (MHz) | $\Delta F_{Global}$ (kHz) | $F_{REF\text{-}Offs}$ (MHz) | $N_{REF\text{-}Offs}$ | Value range of $N_{REF}$ |
|---|---|---|---|---|
| 0-3000 | 5 | 0 | 0 | 0-599999 |
| 3000-24250 | 15 | 3000 | 600000 | 600000-2016666 |

(6) A carrier bandwidth (a channel bandwidth of the network device) limits upper-limit and lower-limit frequencies of a frequency resource that can be used by the network device for communication, in other words, limits a frequency passband. The carrier bandwidth includes uplink and downlink transmission resources. In a band, several different carrier bandwidths may be allocated flexibly. The communications system supports flexible and variable carrier bandwidths. For example, there are the following six configuration manners: 1.4 MHz, 3 MHz, 5 MHz, 10 MHz, 15 MHz, and 20 MHz.

Figure 5:
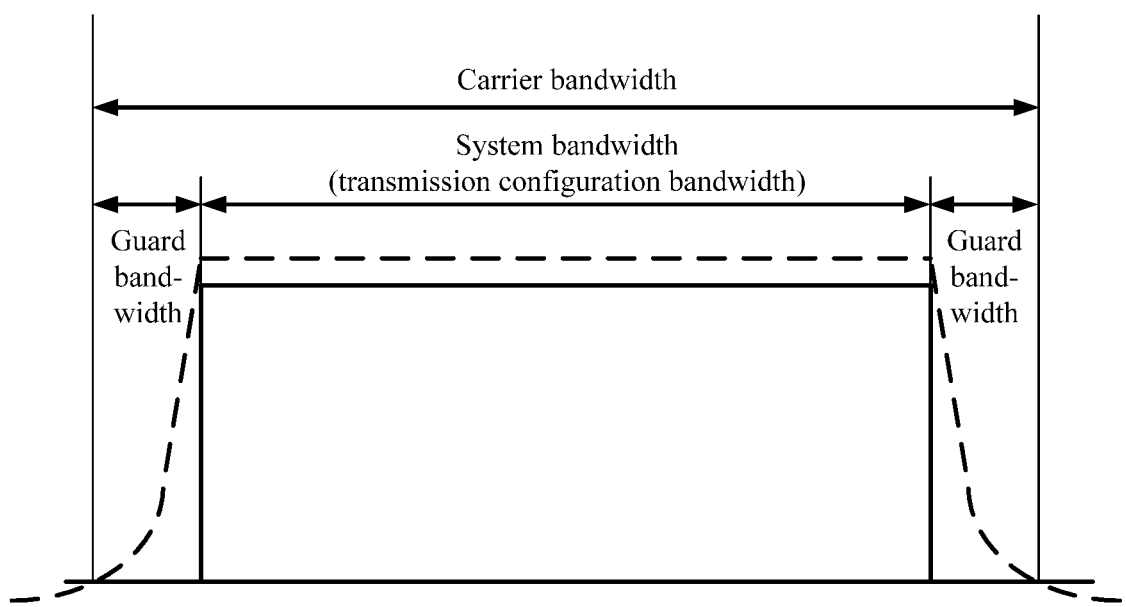
FIG. 5 is a schematic diagram of a location relationship between a carrier bandwidth and a system bandwidth according to an embodiment of this application.

Not all of the carrier bandwidth can be used as a resource for transmitting uplink and downlink data. Parts may be reserved on two sides of the carrier bandwidth to serve as guard bandwidths. As shown in FIG. 5, the carrier bandwidth includes a guard bandwidth and a system bandwidth. Using a 20 MHz carrier bandwidth as an example, one RB includes 12 subcarriers, and a spacing between every two neighboring subcarriers is 15 kHz. If the 20 MHz carrier bandwidth is all used as RBs for data transmission, there may be no RBs. However, during actual spectrum transmission, there may be no theoretically rectangular window, and bevels (where a signal transmission power roll-off occurs) occur inevitably on two edges of the carrier bandwidth. For example, RBs used for resource transmission occupies 90% of the 20 MHz carrier bandwidth. Therefore, for the actual 20 MHz carrier bandwidth, there are 100 RBs that can be used for data transmission. For another example, when a channel bandwidth is 1.4 MHz, the system bandwidth is six RBs that are equal to 1.08 MHz, and 0.32 MHz in the carrier bandwidth is the guard bandwidth. The system bandwidth includes an integer quantity of RBs in the carrier bandwidth.

For example, for a correspondence between a system bandwidth value and a carrier bandwidth value, refer to the following Table 2. The system bandwidth may also be referred to as a transmission configuration bandwidth (transmission bandwidth configuration), and an RB quantity $N_{RB}$ is used to represent the system bandwidth value, and $BW_{channel}$ channel (MHz) is used to represent the carrier bandwidth value. In addition, a center of the carrier bandwidth may be aligned with that of the system bandwidth.

TABLE 2

| BW$_{channel}$ (MHz) | 1.4 | 3 | 5 | 10 | 15 | 20 |
|---|---|---|---|---|---|---|
| N$_{RB}$ | 6 | 15 | 25 | 50 | 75 | 100 |

It should be noted that in an LTE communications system, a channel bandwidth of the network device and a channel bandwidth of the terminal are equal, and both are equal to the carrier bandwidth. In an NR communications system, a channel bandwidth of the network device is equal to the carrier bandwidth, but a channel bandwidth of the terminal is less than or equal to the carrier bandwidth. The channel bandwidth of the network device may also be referred to as a radio frequency bandwidth of the network device or a carrier bandwidth and is measured in MHz. The channel bandwidth of the terminal may also be referred to as a radio frequency bandwidth of the terminal, a carrier bandwidth of the terminal, a filtering bandwidth of the terminal, or the like. The channel bandwidth of the terminal includes uplink and downlink transmission resources and is measured in MHz.

In the embodiments of this application, the channel bandwidth of the terminal may support several determined values, for example, 5 MHz, 15 MHz, 20 MHz, 40 MHz, 50 MHz, 60 MHz, 80 MHz, and 100 MHz. Each channel bandwidth of the terminal may further include corresponding guard bandwidths. The guard bandwidths of the channel bandwidth of the terminal may be located in edge areas on two sides of the channel bandwidth of the terminal.

(7) Maximum transmission bandwidth configuration: is used to define a maximum transmission bandwidth that can be supported, for example, a maximum transmission bandwidth that can be supported by the terminal. For descriptions of the maximum transmission bandwidth configuration, refer to the 3GPP protocol specification TS 38.101.

For example, for different subcarrier spacings, a maximum transmission bandwidth configuration of the terminal for a given channel bandwidth is shown in the following Table 4, where the maximum transmission bandwidth configuration is measured in a form of RBs. As shown in Table 4, the channel bandwidth of the terminal may be 5 MHz, 10 MHz, 15 MHz, 20 MHz, 25 MHz, 30 MHz, 40 MHz, 50 MHz, 60 MHz, 80 MHz, or 100 MHz. For example, when the channel bandwidth of the terminal is 5 MHz, for 15 kHz, the maximum transmission bandwidth configuration of the terminal is 25 RBs.

TABLE 4

| Subcarrier spacing (kHz) | 5 MHz N$_{RB}$ | 10 MHz N$_{RB}$ | 15 MHz N$_{RB}$ | 20 MHz N$_{RB}$ | 25 MHz N$_{RB}$ | 30 MHz N$_{RB}$ | 40 MHz N$_{RB}$ | 50 MHz N$_{RB}$ | 60 MHz N$_{RB}$ | 80 MHz N$_{RB}$ | 100 MHz N$_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

(8) Resource Grid:

In a carrier, a resource grid may be configured or defined in a transmission direction for a given subcarrier spacing. For details, refer to the 3GPP protocol specification TS 38.211. For example, for a given subcarrier spacing μ in uplink or downlink identified by x, a resource grid includes $N_{grid,x}^{size,\mu} N_{sc}^{RB}$ subcarriers in frequency domain and $N_{symb}^{subframe,\mu}$ OFDM symbols in time domain, where $N_{grid,x}^{size,\mu}$ is a resource grid size or a quantity of RBs included in the resource grid, and is measured in a form of RBs, $N_{sc}^{RB}$ is a quantity of subcarriers included in each RB, for example, $N_{sc}^{RB}$ is equal to 12, and $N_{symb}^{subframe,\mu}$ is a quantity of OFDM symbols included in each subframe, for example, $N_{symb}^{subframe,\mu}$ is 14, 28, 56, or another positive integer.

A start location of the resource grid in frequency domain may be $N_{grid}^{start,\mu}$, where $N_{grid}^{start,\mu}$ may be notified to the terminal by the network device by using signaling, and $N_{grid}^{start,\mu}$ is an integer and is measured in a form of RBs.

The network device may configure a BWP for the terminal in the resource grid.

(9) Upconversion Carrier Frequency:

For descriptions of the upconversion carrier frequency, refer to the 3GPP protocol specification TS 38.211.

For example, a location of the upconversion carrier frequency may be represented by $f_0$, and for a baseband signal $s_l^{(p,\mu)}(t)$, an antenna port p, a subcarrier spacing μ, an OFDM symbol l, and time t, if start time of a subframe in which the symbol l is located meets t=0, an upconversion operation may be $$\mathrm{Re}\left\{s_l^{(p,\mu)}(t) \cdot e^{j2\pi f_0\left(t - t_{start,l}^{\mu} - N_{CP,l}^{\mu} T_c\right)}\right\},$$

where $t_{start,l}^{\mu}$ represents start time, in the subframe, of the OFDM symbol l corresponding to the subcarrier spacing μ, $N_{CP,l}^{\mu}$ represents a cyclic prefix length corresponding to the symbol l, and $T_c=1/(\Delta f_{max} \cdot N_f)$, where $\Delta f_{max}=480 \cdot 10^3$ Hz, and $N_f=4096$.

The "plurality of" in this application means two or more.

In the embodiments of this application, the mathematical notation $\lfloor \ \rfloor$ represents rounding-down, for example, if A=3.9, $\lfloor A \rfloor$=3; and the mathematical notation $\lceil \ \rceil$ represents rounding-up, for example, if B=3.1, $\lceil B \rceil$=4.

In the descriptions of this application, terms such as "first" and "second" are used only for differentiation, but cannot be understood as indicating or implying relative importance, or indicating or implying an order.

In addition, in LTE, the value of the terminal-supported bandwidth is equal to that of the carrier bandwidth, and a center frequency of the BWP configured for the terminal is the same as a center frequency in the carrier bandwidth. In the NR communications system, in a scenario in which a carrier bandwidth increases and a BWP is configured for a terminal, considering terminal costs and a traffic volume of the terminal, the terminal-supported bandwidth may be less than the carrier bandwidth. The terminal-supported bandwidth may be referred to as the radio frequency bandwidth of the terminal or the channel bandwidth of the terminal.

After introduction of the BWP, the terminal needs to know only a bandwidth occupied by the BWP, and no longer needs to know a value of the carrier bandwidth. In NR, after the value of the carrier bandwidth does not need to be notified, the following effects are achieved:

(1) A spectrum using method may be adjusted, for example, a part of a bandwidth can be reserved for other purposes, for example, for forward compatibility or a future possible service.

(2) Inter-cell interference coordination may be implemented, and strong interference can be avoided by adjusting a central location of the carrier bandwidth and the value of the carrier bandwidth.

(3) Different carriers may be used for different services of the terminal. For example, different carriers may be used for an enhanced mobile broadband (eMBB) service and an ultra-reliable and low latency communications (URLLC) service.

(4) Adapting to a Flexibly Changing Traffic Volume

In the LTE communications system, the network device notifies the system bandwidth to the terminal by using a physical broadcast channel (PBCH). In the NR communications system, to adapt to a flexibly changing system bandwidth, if a PBCH is still used for notification, the terminal may not work normally after the system bandwidth changes. In this case, a cell needs to be restarted, all terminals accessing the cell need to be disconnected and re-connected, and therefore a process is very complex. However, after introduction of the BWP, bit overheads for resource allocation are reduced while the network device does not need to notify the system bandwidth to the terminal.

Figure 6:
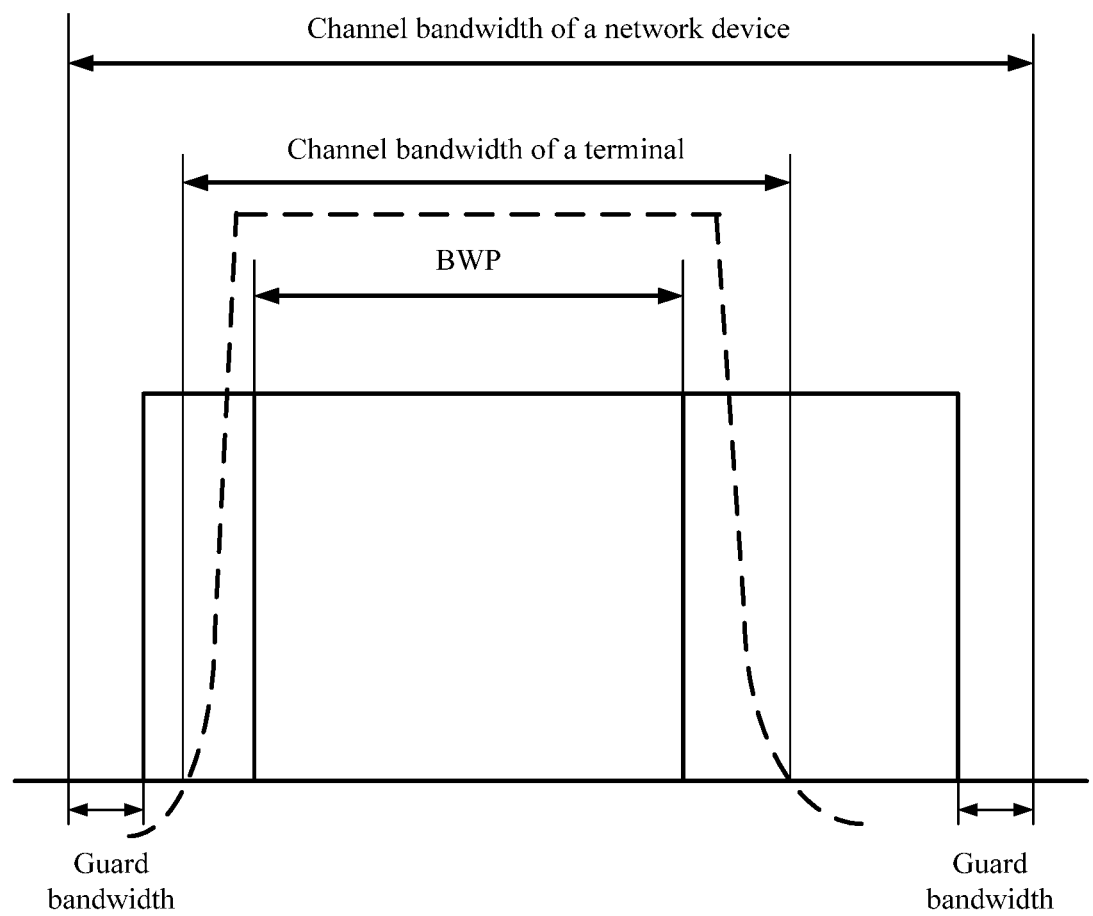
FIG. 6 is a schematic diagram of a location relationship between a carrier bandwidth and a bandwidth of a BWP for a terminal according to an embodiment of this application.

In the NR communications system, considering introduction of the BWP, on a terminal side, a relationship between a channel bandwidth (e.g., a carrier bandwidth) of a network device and a BWP bandwidth of the terminal may be shown in FIG. 6. In the NR communications system, the value of the channel bandwidth of the terminal may not be consistent with the value of the carrier bandwidth (namely, a value of the channel bandwidth of the network device). In addition, because the network device does not notify the carrier bandwidth to the terminal, and the terminal knows only a bandwidth occupied by the BWP, the terminal is unclear of a specific location of the channel bandwidth of the terminal in the carrier bandwidth. In the LTE communications system, the value of the channel bandwidth of the terminal is the same as that of the carrier bandwidth, and a center frequency of the BWP configured for the terminal is the same as a center frequency in the carrier bandwidth. Therefore, the terminal can determine a location of the channel bandwidth of the terminal based on a location of a bandwidth occupied by the BWP. However, in the NR communications system, the value of the channel bandwidth of the terminal may be less than the value of the carrier bandwidth, and based on this, the terminal cannot determine the channel bandwidth of the terminal when knowing only the bandwidth occupied by the BWP.

Figure 7:
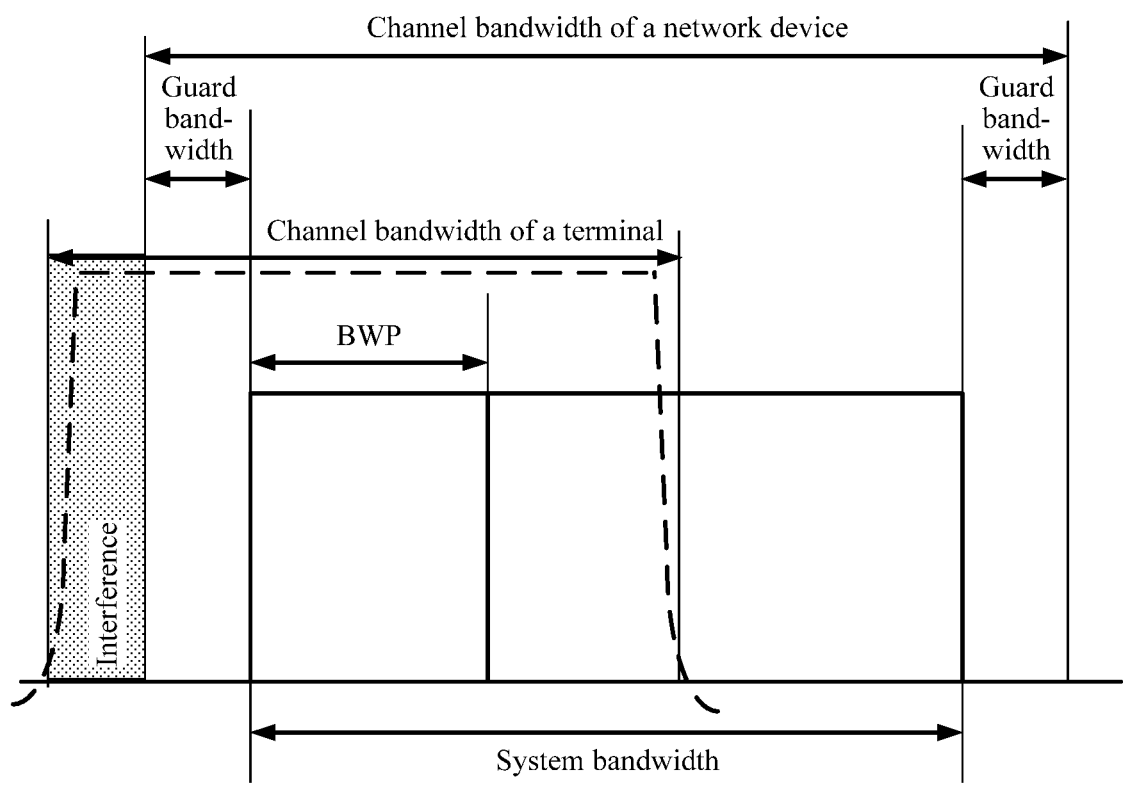
FIG. 7 is a schematic diagram of interference to reception of a terminal according to an embodiment of this application.

When the location of the channel bandwidth of the terminal is still determined according to a rule in LTE that the center frequency of the BWP configured for the terminal is the same as the center frequency in the carrier bandwidth, and data is received based on the channel bandwidth that is of the terminal and that is determined according to the rule, the channel bandwidth that is of the terminal and that is determined according to the rule may exceed the carrier bandwidth if the BWP is configured at an edge location of the carrier bandwidth. Consequently, the terminal receives data outside the carrier bandwidth. A filter in the terminal may not be capable of processing the data outside the carrier bandwidth. This results in relatively strong interference to reception of the terminal, and then affects reception performance of the terminal, as shown in FIG. 7.

Based on this, the embodiments of this application provide an information transmission method and an apparatus. A network device sends first information to a terminal, to indicate a location of a channel bandwidth of the terminal. In this way, the terminal can determine the location of the channel bandwidth of the terminal based on the first information, and then can avoid receiving data outside a carrier bandwidth. The method and the apparatus are based on a same embodiment. Because problem-resolving principles of the method are similar to those of the apparatus, mutual reference may be made to implementations of the apparatus and the method. No repeated description is provided.

In the embodiments of this application, an apparatus that performs a method on a network device side may be a network device or an apparatus disposed in a network device. The apparatus disposed in the network device may be a chip, a module, a circuit, or the like. This is not specifically limited in this application. The network device may be used as an example for description in the embodiments of this application.

In the embodiments of this application, an apparatus that performs a method on a terminal side may be a terminal or an apparatus disposed in a terminal. The apparatus disposed in the terminal may be a chip, a module, a circuit, or the like. This is not specifically limited in this application. The terminal may be used as an example for description in the embodiments of this application.

Figure 8:
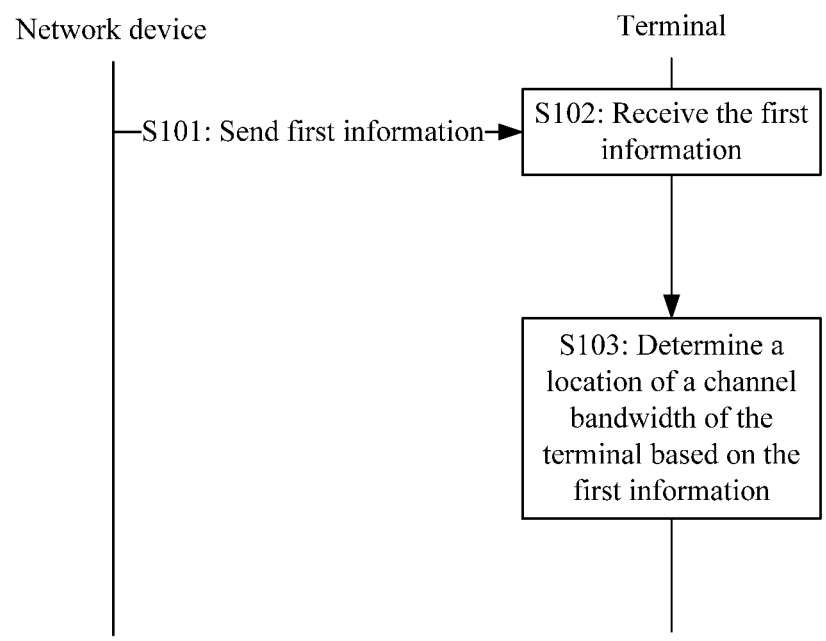
FIG. 8 is a schematic flowchart of an information transmission method according to an embodiment of this application.

FIG. 8 shows an information transmission method according to an embodiment of this application. The method includes the following steps.

S101: A network device sends first information to a terminal, where the first information is used to indicate a location of a channel bandwidth of the terminal.

The first information may be terminal-specific (UE-specific) information. For different terminals, the first information may be different or the same. This is not limited in this application.

S102: The terminal receives the first information.

S103: The terminal determines the location of the channel bandwidth of the terminal based on the first information.

In the foregoing solution, the network device specifically indicates the location of the channel bandwidth of the terminal to the terminal by using the first information, so that the terminal adjusts the channel bandwidth to the indicated location, and receives data on a corresponding frequency-domain resource. This avoids that reception performance of the terminal is affected because the terminal receives a signal outside a carrier bandwidth.

In the embodiments of this application, one piece of the first information may be used to indicate a location of one channel bandwidth of the terminal, the one channel bandwidth is corresponding to one bandwidth part BWP for the terminal, and the one BWP for the terminal includes some contiguous frequency-domain resources in a carrier bandwidth. When one BWP is configured for the terminal, one piece of first information may be used to indicate a location of one channel bandwidth, of the terminal, corresponding to the BWP. When a plurality of BWPs are configured for the terminal, channel bandwidths, of the terminal, corresponding to different BWPs may be the same or different. When the channel bandwidths are the same, the first information may be used to indicate locations of channel bandwidths, of the terminal, corresponding to all BWPs configured for the terminal. When the channel bandwidths are different, for the plurality of BWPs, a piece of different first information may be used to indicate a location of one channel bandwidth of the terminal, and the location, of the one channel bandwidth, indicated by the piece of different first information may be corresponding to a different BWP. For example, two BWPs: a BWP 0 and a BWP 1, are configured for the terminal. For the BWP 0, the network device may use information 1 to indicate a location of a channel bandwidth, of the terminal, corresponding to the BWP 0. For the BWP 1, the network device may use information 2 to indicate a location of a channel bandwidth, of the terminal, corresponding to the BWP 1. In addition, when a plurality of BWPs are configured for the terminal, channel bandwidths, of the terminal, corresponding to several BWPs may be the same, and channel bandwidths, of the terminal, corresponding to remaining several BWPs are different. For example, four BWPs: a BWP 1 to a BWP 4, are configured for the terminal, channel bandwidths, of the terminal, corresponding to the BWP 1 and the BWP 2 are the same, and channel bandwidths, of the terminal, corresponding to the BWP3 and the BWP4 are different. Specifically, one piece of information may be used for the BWPs for which the channel bandwidths of the terminal are the same, and different pieces of information are used for the BWPs for which the channel bandwidths of the terminal are different.

In the embodiments of this application, in one manner, a value of the channel bandwidth of the terminal may be predefined. In another manner, the network device configures a value of the channel bandwidth of the terminal for the terminal. Specifically, the network device may further send second information to the terminal. The second information is used to indicate the value of the channel bandwidth of the terminal. The network device may add the first information and the second information to same signaling, and send the signaling to the terminal, or may add the first information and the second information to different signaling, and send the signaling to the terminal. In still another manner, a value of the channel bandwidth of the terminal is determined based on a configured correspondence and a bandwidth value of a BWP. For a specific determining manner, refer to subsequent descriptions in Table 5 and Table 6. Details are not described herein.

In the embodiments of this application, the network device may indicate the location of the channel bandwidth of the terminal in the following manners:

In a first implementation, the network device may indicate the location of the channel bandwidth of the terminal by indicating an absolute frequency channel number corresponding to a frequency in the channel bandwidth of the terminal.

In a second implementation, the network device may indicate the location of the channel bandwidth of the terminal by indicating an offset of a resource unit in the channel bandwidth of the terminal relative to a reference resource unit in frequency domain.

The offset of the resource unit in the channel bandwidth of the terminal relative to the reference resource unit in frequency domain may also be described as an offset between the resource unit in the channel bandwidth of the terminal and the reference resource unit in frequency domain.

In a third implementation, several relative location relationships between a BWP and a channel bandwidth of the terminal are predefined, and the network device may indicate a location relationship between a BWP and a channel bandwidth of the terminal to the terminal.

In a fourth implementation, the network device may indicate an offset of a center frequency in the channel bandwidth of the terminal relative to a location of an upconversion carrier frequency of the terminal.

In a fifth implementation, the network device may indicate an offset of a center frequency in the channel bandwidth of the terminal relative to a center subcarrier in a resource grid.

The following specifically describes the first implementation.

The network device may indicate the location of the channel bandwidth of the terminal by indicating the absolute frequency channel number corresponding to the frequency in the channel bandwidth of the terminal. The first information sent by the network device to the terminal includes an absolute frequency channel number corresponding to a reference frequency in the channel bandwidth of the terminal.

The reference frequency may be any frequency in the channel bandwidth of the terminal. For example, the reference frequency in the channel bandwidth of the terminal may be a center frequency in the channel bandwidth of the terminal, the reference frequency in the channel bandwidth of the terminal may be a minimum frequency in the channel bandwidth of the terminal, or the reference frequency in the channel bandwidth of the terminal is a maximum frequency in the channel bandwidth of the terminal.

Which frequency in the channel bandwidth of the terminal is specifically the reference frequency may be predefined, or may be dynamically indicated. The network device may determine which frequency is the reference frequency, and configure the reference frequency for the terminal.

In an example in which the reference frequency in the channel bandwidth of the terminal is the center frequency in the channel bandwidth of the terminal, the network device notifies, to the terminal, an absolute frequency channel number corresponding to the center frequency in the channel bandwidth of the terminal, so that the terminal can determine the location of the channel bandwidth of the terminal based on the absolute frequency channel number of the center frequency.

Specifically, in one manner, the terminal may align a center frequency of a channel raster corresponding to the absolute frequency channel number with the center frequency in the channel bandwidth of the terminal. In another manner, the terminal may align a minimum frequency of a channel raster corresponding to the absolute frequency channel number with the center frequency in the channel bandwidth of the terminal. In still another manner, the terminal may align a maximum frequency of a channel raster corresponding to the absolute frequency channel number with the center frequency in the channel bandwidth of the terminal.

For example, a manner of classifying absolute frequency channel numbers that is shown in Table 1 is used as an example. If the absolute frequency channel number corresponding to the center frequency in the channel bandwidth of the terminal is an ARFCN 0, a center frequency, in a carrier corresponding to the absolute frequency channel number, determined according to the formula (3) is $f_0$. After aligning the center frequency in the carrier corresponding to the absolute frequency channel number with the center frequency in the channel bandwidth of the terminal, the terminal determines that the center frequency in the channel bandwidth of the terminal is $f_0$. If determining that the value of the channel bandwidth of the terminal is f (MHz), the terminal may determine that the location of the channel bandwidth of the terminal is from $(f_0-f)$ to $(f_0+f)$.

For another example, a manner of classifying absolute frequency channel numbers that is shown in FIG. 4 is used as an example. It is assumed that the absolute frequency channel number corresponding to the center frequency in the channel bandwidth of the terminal is 1200. The terminal may determine, according to the formula (1), that a minimum frequency of a channel raster corresponding to the absolute frequency channel number is 1805 MHz. If a size of the channel raster in FIG. 4 is 100 kHz, a lower boundary frequency of the channel raster corresponding to the absolute frequency channel number is 1805 MHz. After aligning the lower boundary frequency of the channel raster corresponding to the absolute frequency channel number with the center frequency in the channel bandwidth of the terminal, the terminal determines that the center frequency in the channel bandwidth of the terminal is 1805 MHz. If determining that the value of the channel bandwidth of the terminal is 10 MHz, the terminal may determine that the location of the channel bandwidth of the terminal is from 1800 MHz to 1810 MHz in the carrier bandwidth.

In the embodiments of this application, when the network device configures one BWP for the terminal, for example, if the BWP is corresponding to one channel bandwidth of the terminal, and an absolute frequency channel number corresponding to a reference frequency in the channel bandwidth of the terminal is an ARFCN 0, the network device uses one piece of first information to indicate a location of the channel bandwidth of the terminal. Specifically, the first information may include that the absolute frequency channel number corresponding to the reference frequency in the channel bandwidth of the terminal is the ARFCN 0. When the network device configures a plurality of BWPs for the terminal, if all the plurality of BWPs are corresponding to a same channel bandwidth of the terminal, and an absolute frequency channel number corresponding to a reference frequency in the channel bandwidth of the terminal is an ARFCN 1, the network device uses one piece of first information to indicate a location of the channel bandwidth of the terminal. Specifically, the first information may include that the absolute frequency channel number corresponding to the reference frequency in the channel bandwidth of the terminal is the ARFCN 1.

When the network device configures a plurality of BWPs for the terminal, if different BWPs are corresponding to different channel bandwidths of the terminal, for example, if there is a BWP 2 and a BWP 3, the BWP 2 is corresponding to a channel bandwidth 2 of the terminal, an absolute frequency channel number corresponding to a reference frequency in the channel bandwidth 2 of the terminal is an ARFCN 2, the BWP 3 is corresponding to a channel bandwidth 3 of the terminal, and an absolute frequency channel number corresponding to a reference frequency in the channel bandwidth 3 of the terminal is an ARFCN 3, the network device uses two pieces of first information (for example, information 1 and information 2) to indicate locations of the channel bandwidths of the terminal. Specifically, the information 1 may indicate that the BWP 2 is corresponding to the ARFCN 2, and the information 2 indicates that the BWP 3 is corresponding to the ARFCN 3.

When the network device configures a plurality of BWPs for the terminal, if some of different BWPs are corresponding to different channel bandwidths of the terminal, and the other BWPs are corresponding to a same channel bandwidth of the terminal, for example, if four BWPs: a BWP 1 to a BWP 4, are configured for the terminal, the BWP 1 and the BWP 2 are corresponding to a channel bandwidth 1 of the terminal, the BWP 3 and the BWP 4 are respectively corresponding to a channel bandwidth 2 of the terminal and a channel bandwidth 3 of the terminal, an absolute frequency channel number corresponding to a reference frequency in the channel bandwidth 1 of the terminal is an ARFCN 1, an absolute frequency channel number corresponding to a reference frequency in the channel bandwidth 2 of the terminal is an ARFCN 2, and an absolute frequency channel number corresponding to a reference frequency in the channel bandwidth 3 of the terminal is an ARFCN 3, the network device uses three pieces of first information (for example, information 1, information 2, and information 3) to indicate locations of the channel bandwidths of the terminal. Specifically, the information 1 may indicate that the BWP 1 and the BWP 2 are corresponding to the ARFCN 1, the information 2 indicates that the BWP 3 is corresponding to the ARFCN 2, and the information 3 indicates that the BWP 4 is corresponding to the ARFCN 3.

Optionally, the network device may add one or more pieces of first information and configuration information of the BWP configured for the terminal to same signaling, and send the signaling to the terminal, or may add one or more pieces of first information and configuration information of the BWP configured for the terminal to different signaling, and send the signaling to the terminal.

Optionally, the network device may alternatively add the one or more pieces of first information to configuration information of the BWP, and send the configuration information of the BWP to the terminal. Specifically, the one or more pieces of first information may be used as an attribute of the BWP. For example, the configuration information, of the BWP, carrying the first information may be sent to the terminal by using radio resource control (RRC) signaling.

In a configuration manner, for example, the network device configures K BWPs for the terminal.

Configuration information of the K BWPs is:

{locations of the BWPs: 1, 2, . . . , and K;

locations of channel bandwidths of the terminal: 1, 2, . . . , and K}.

1 to K corresponding to the locations of the BWPs indicate location information of the first to the $K^{th}$ BWPs. 1 to K corresponding to the locations of channel bandwidths of the terminal indicate location information of channel bandwidths, of the terminal, corresponding to the first to the $K^{th}$ BWPs. The location information of the BWPs is sequentially in a one-to-one correspondence with the location information of the channel bandwidths of the terminal.

In a configuration manner, for example, the network device configures k BWPs for the terminal: a BWP 0, a MVP 1, . . . , and a BWP (k−1):

BWP 0 {location information of the BWP 0, location information of a channel bandwidth of the terminal};

BWP 1 {location information of the BWP 1, location information of a channel bandwidth of the terminal};

. . .

BWP (k−1) {location information of the BWP (k−1), location information of a channel bandwidth of the terminal}.

Optionally, if a total of A absolute frequency channel numbers are defined in all bands, a length of an information field of the first information may be L1: L1=[$\log_2(A)$]. Optionally, if quantities of absolute frequency channel numbers included in different bands are determined, for example, a band X includes BX absolute frequency channel numbers, a length of an information field of the first information may be L2: L2=[$\log_2(BX)$].

In the foregoing solution, when configuring a BWP or configuring a channel bandwidth of the terminal for a BWP, the network device can flexibly adjust the location of the channel bandwidth of the terminal, to prevent the channel bandwidth of the terminal from falling outside a carrier bandwidth, thereby avoiding interference to reception of the terminal.

The following specifically describes the second implementation.

The network device may indicate the location of the channel bandwidth of the terminal by indicating the offset of the resource unit in the channel bandwidth of the terminal relative to the reference resource unit in frequency domain.

In a possible implementation, the reference resource unit may be a reference point in the BWP for the terminal.

A reference point PRB 0 may be a start PRB in a largest carrier (for example, having 275 PRBs), and the PRB is used to configure a BWP for the terminal. In a process in which the terminal initially accesses the network device, the terminal detects a synchronization signal (SS) block, and obtains a location of remaining minimum system information (RMSI) from the SS block. The RMSI carries an offset of the PRB 0 relative to a center of the SS block. Because the center of the SS block is predetermined, based on this, the terminal can obtain a location of the PRB 0. The network device sends the first information to the terminal. The first information may include an offset of the nth resource unit in the channel bandwidth of the terminal relative to the PRB 0 in frequency domain, in other words, the first information may include an offset of any resource unit in the channel bandwidth of the terminal relative to the PRB 0 in frequency domain, where n is a positive integer less than or equal to M, and M is a quantity of resource units in the channel bandwidth of the terminal.

For example, n may be equal to 1. To be specific, the first information includes an offset of an edge PRB on a lower boundary of the channel bandwidth of the terminal relative to the PRB 0 in frequency domain. n may be equal to M. To be specific, the first information includes an offset of an edge PRB on an upper boundary of the channel bandwidth of the terminal relative to the PRB 0 in frequency domain. Alternatively, the first information includes an offset of a center PRB in the channel bandwidth of the terminal relative to the PRB 0 in frequency domain. To be specific, when M is an even number, a value of n may be M/2 or M/2+1, or when M is an odd number, a value of n may be equal to (N+1)/2.

Optionally, M may be a quantity of resource units included in the channel bandwidth, of the terminal, excluding a guard bandwidth.

In the embodiments of this application, resource units in the channel bandwidth may be numbered 0, 1, 2, . . . , and M−1, or may be numbered 1, 2, 3, . . . , and M. Certainly, there may be another manner. This is not specifically limited in this application. If the resource units are numbered from 0, the first resource unit is a resource unit numbered 0, and the $M^{th}$ resource unit is a resource unit numbered M−1. If the resource units are numbered from 1, the first resource unit is a resource unit numbered 1, and the $M^{th}$ resource unit is a resource unit numbered M.

In the embodiments of this application, when the network device configures one BWP for the terminal, for example, the BWP is corresponding to one channel bandwidth of the terminal, one piece of the first information is used to indicate a location of the one channel bandwidth of the terminal.

When the network device configures a plurality of BWPs for the terminal, if all different BWPs are corresponding to different channel bandwidths of the terminal, for example, if there is a BWP 0 and a BWP 1, the BWP 0 is corresponding to a channel bandwidth 1 of the terminal, and the BWP 1 is corresponding to a channel bandwidth 2 of the terminal, the network device uses two pieces of first information (for example, information 1 and information 2) to indicate locations of the channel bandwidths, of the terminal, corresponding to the two BWPs. The information 1 includes an offset of the nth resource unit in the channel bandwidth 1, of the terminal, corresponding to the BWP 0 relative to the PRB 0 in frequency domain, and the information 2 includes an offset of the nth resource unit in the channel bandwidth 2, of the terminal, corresponding to the BWP 1 relative to the PRB 0 in frequency domain.

In another possible implementation, the reference resource unit may be predefined. For example, the reference resource unit is a resource unit in the BWP for the terminal, for example, the $q^{th}$ resource unit, where q is a positive integer and an integer less than or equal to Q, and Q is a quantity of resource units in the BWP for the terminal. Based on this, the first information may include an offset of the $n^{th}$ resource unit in the channel bandwidth of the terminal relative to the $q^{th}$ resource unit in the BWP for the terminal in frequency domain.

It should be noted that the channel bandwidth of the terminal herein is corresponding to the BWP for the terminal.

In the embodiments of this application, when the network device configures one BWP for the terminal, for example, the BWP is corresponding to one channel bandwidth of the terminal, one piece of the first information is used to indicate a location of the one channel bandwidth of the terminal. When the network device configures a plurality of BWPs for the terminal, if all different BWPs are corresponding to different channel bandwidths of the terminal, for example, if there is a BWP 0 and a BWP 1, the BWP 0 is corresponding to a channel bandwidth 1 of the terminal, and the BWP 1 is corresponding to a channel bandwidth 2 of the terminal, the network device uses two pieces of first information (for example, information 1 and information 2) to indicate locations of the channel bandwidths, of the terminal, corresponding to the two BWPs. The information 1 includes an offset of the $n^{th}$ resource unit in the channel bandwidth 1, of the terminal, corresponding to the BWP 0 relative to the $q^{th}$ resource unit in the BWP 0 in frequency domain, and the information 2 includes an offset of the $n^{th}$ resource unit in the channel bandwidth 2 of the terminal relative to the $q^{th}$ resource unit in the BWP 1 in frequency domain.

Optionally, q may be equal to 1, 2, 3, . . . , or Q. For example, if q is equal to 1, the first information may include an offset of the nth resource unit in the channel bandwidth of the terminal relative to an edge PRB on a lower boundary of the BWP for the terminal in frequency domain. If q is equal to Q, the first information includes an offset of the $n^{th}$ resource unit in the channel bandwidth of the terminal relative to an edge PRB on an upper boundary of the BWP for the terminal in frequency domain. Alternatively, the first information may include an offset of the nth resource unit in the channel bandwidth of the terminal relative to a center PRB in the BWP for the terminal in frequency domain. To be specific, when Q is an even number, q is equal to Q/2 or Q/2+1, or when Q is an odd number, q is equal to (Q+1)/2.

In the embodiments of this application, resource units in the BWP may be numbered 0, 1, 2, . . . , and Q−1, or may be numbered 1, 2, 3, . . . , and Q. Certainly, there may be another manner. This is not specifically limited in this application. If the resource units are numbered from 0, the first resource unit is a resource unit numbered 0, and the $Q^{th}$ resource unit is a resource unit numbered Q−1. If the resource units are numbered from 1, the first resource unit is a resource unit numbered 1, and the $Q^{th}$ resource unit is a resource unit numbered Q.

For example, the first information may include an offset of an edge PRB on a lower boundary of the channel bandwidth of the terminal relative to a PRB on a lower boundary of the BWP for the terminal in frequency domain. Alternatively, the first information may include an offset of an edge PRB on an upper boundary of the channel bandwidth of the terminal relative to a PRB on a lower boundary of the BWP for the terminal in frequency domain. Alternatively, the first information may include an offset of a center PRB in the channel bandwidth of the terminal relative to a PRB on a lower boundary of the BWP for the terminal in frequency domain. Alternatively, the first information may include an offset of an edge PRB on a lower boundary of the channel bandwidth of the terminal relative to a PRB on an upper boundary of the BWP for the terminal in frequency domain. Alternatively, the first information may include an offset of an edge PRB on an upper boundary of the channel bandwidth of the terminal relative to a PRB on an upper boundary of the BWP for the terminal in frequency domain. Alternatively, the first information may include an offset of a center PRB in the channel bandwidth of the terminal relative to a PRB on an upper boundary of the BWP for the terminal in frequency domain. Alternatively, the first information may include an offset of an edge PRB on a lower boundary of the channel bandwidth of the terminal relative to a center PRB in the BWP for the terminal in frequency domain. Alternatively, the first information may include an offset of an edge PRB on an upper boundary of the channel bandwidth of the terminal relative to a center PRB in the BWP for the terminal in frequency domain. Alternatively, the first information may include an offset of a center PRB in the channel bandwidth of the terminal relative to a center PRB in the BWP for the terminal in frequency domain.

The following specifically describes the third implementation.

Several relative location relationships between a BWP and a channel bandwidth of the terminal are configured. The network device may indicate a location relationship between a BWP and a channel bandwidth of the terminal to the terminal.

For example, the following three relative location relationships are predefined.

Figure 9:
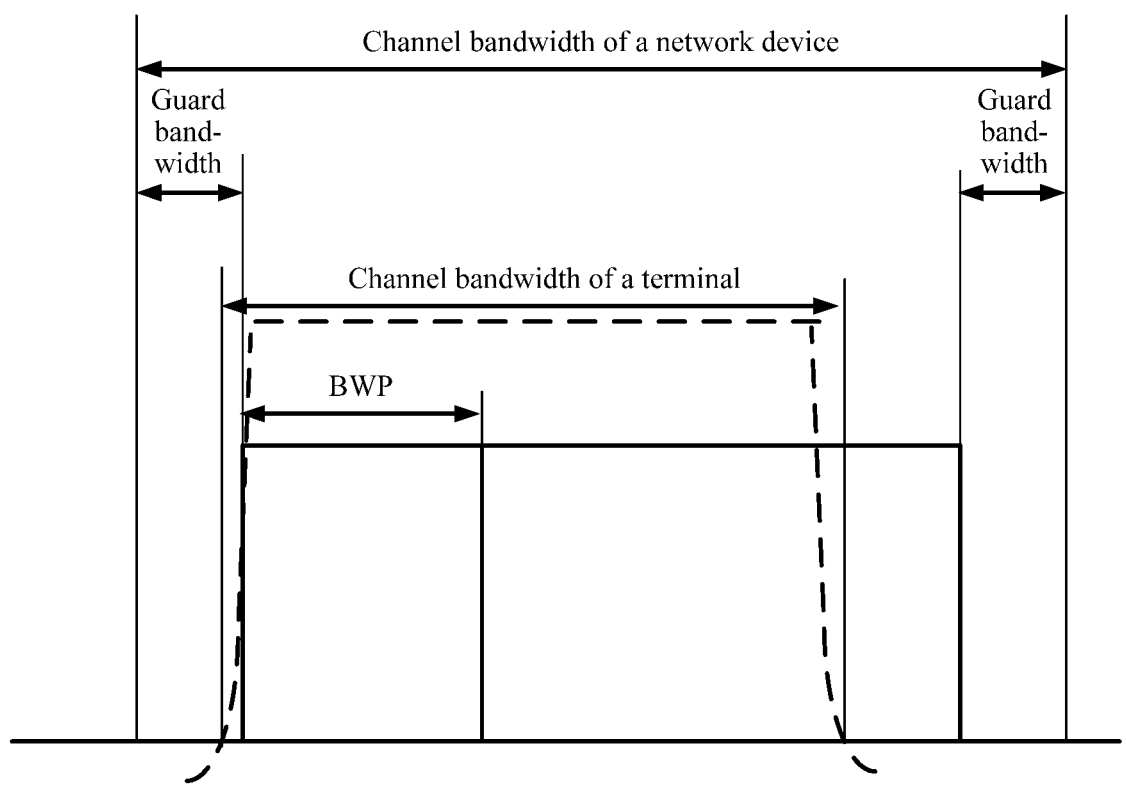
FIG. 9 is a schematic diagram of a first relative location relationship according to an embodiment of this application.

For a first relative location relationship, referring to FIG. 9, an edge PRB on a lower boundary of the channel bandwidth of the terminal is aligned with the first PRB in the BWP for the terminal. In other words, the first resource unit in the channel bandwidth of the terminal is the same as the first resource unit in the BWP for the terminal.

Figure 10:
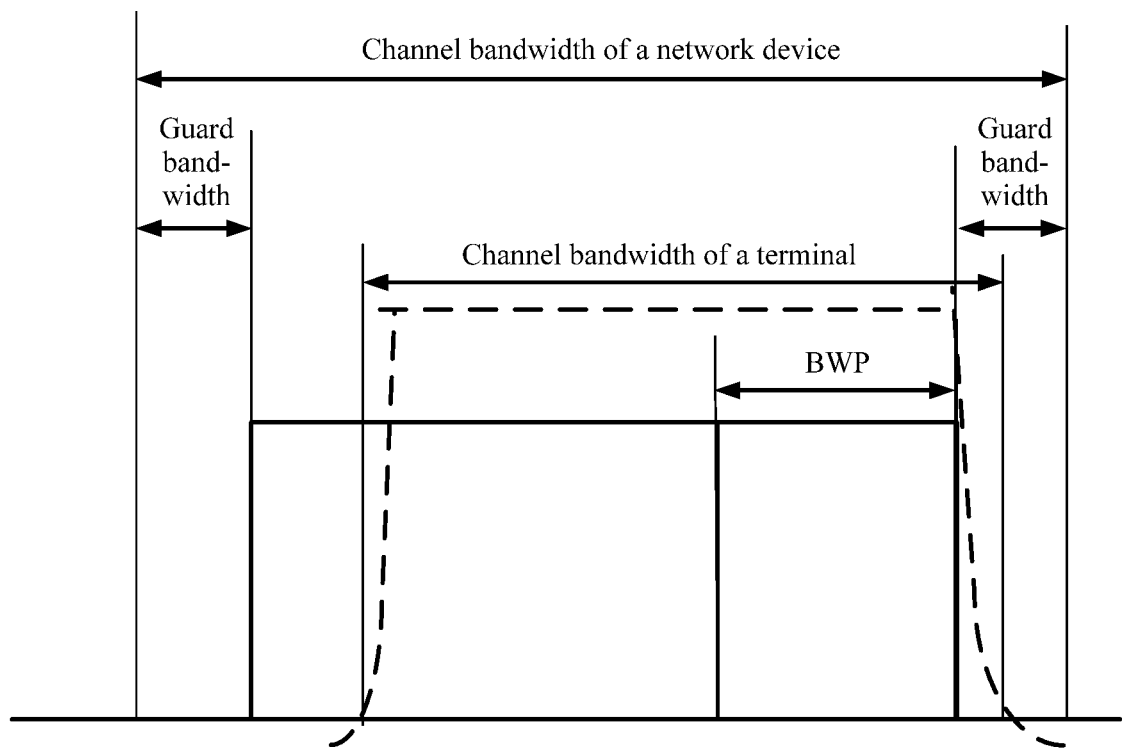
FIG. 10 is a schematic diagram of a second relative location relationship according to an embodiment of this application.

For a second relative location relationship, referring to FIG. 10, the first information indicates that an edge PRB on an upper boundary of the channel bandwidth of the terminal is aligned with an edge PRB on an upper boundary of the BWP for the terminal. In other words, the $X^{th}$ resource unit in the channel bandwidth of the terminal is the same as the $Y^{th}$ resource unit in the BWP for the terminal. X is equal to a quantity of resource units in the channel bandwidth of the terminal, and Y is equal to a quantity of resource units in the BWP for the terminal.

Figure 11:
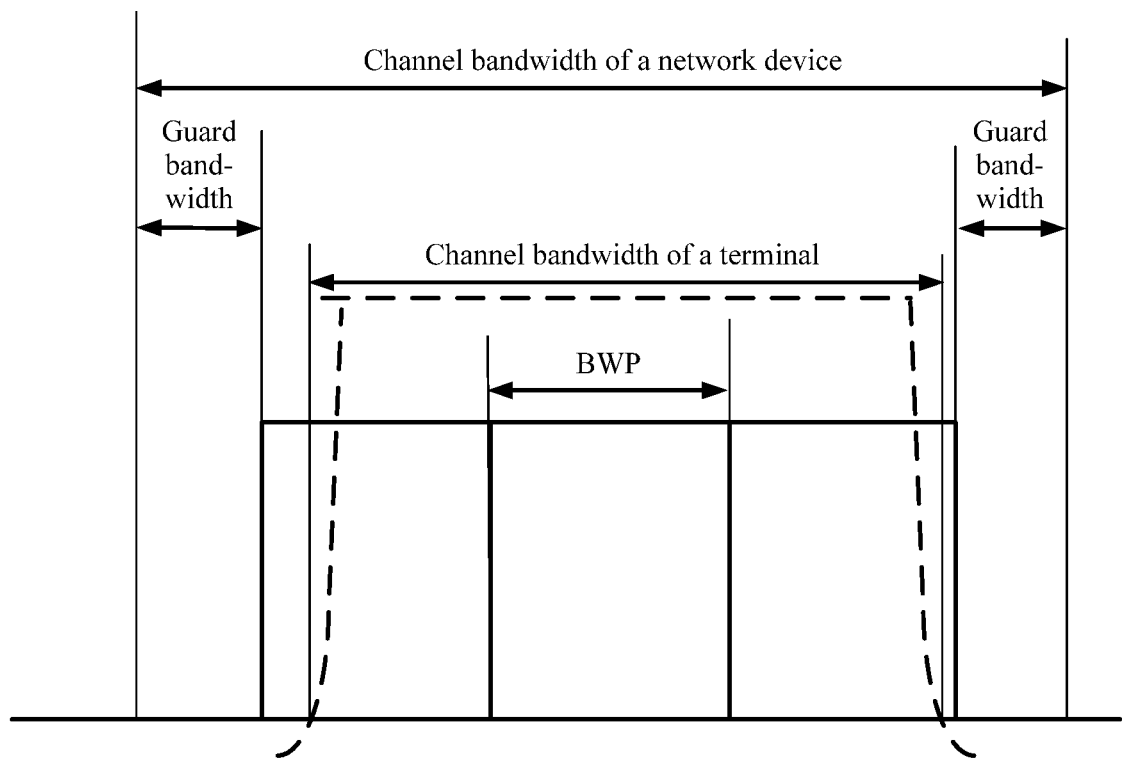
FIG. 11 is a schematic diagram of a third relative location relationship according to an embodiment of this application.

For a third relative location relationship, referring to FIG. 11, the first information indicates that a center PRB in the channel bandwidth of the terminal is aligned with a center PRB in the BWP for the terminal. In other words, the $i^{th}$ resource unit in the channel bandwidth of the terminal is the same as the $j^{th}$ resource unit in the BWP for the terminal. If X is an even number, i is equal to X/2 or X/2+1. If X is an odd number, i is equal to (X+1)/2. If Y is an even number, j is equal to Y/2 or Y/2+1. If Y is an odd number, j is equal to (Y+1)/2. X is equal to a quantity of resource units in the channel bandwidth of the terminal, and Y is equal to a quantity of resource units in the BWP for the terminal.

The network device may indicate a relative location relationship to the terminal based on a configuration.

Optionally, when sending configuration information of the BWP to the terminal, the network device may send a used relative location relationship to the terminal, or may add an indication field to the configuration information, where the indication field is used to indicate which one of the foregoing relative location relationships is used by the terminal. For example, the indication field occupies 2 bits. When the indication field is 00, it indicates that the first relative location relationship is used. When the indication field is 01, it indicates that the second relative location relationship is used. When the indication field is 10, it indicates that the third relative location relationship is used.

The following specifically describes the fourth implementation.

The network device may indicate an offset of a frequency in the channel bandwidth of the terminal relative to the location of the upconversion carrier frequency of the terminal, to indicate the location of the channel bandwidth of the terminal. The frequency in the channel bandwidth of the terminal may be a center frequency in the channel bandwidth, a lowest frequency in the channel bandwidth, a highest frequency in the channel bandwidth, or any frequency in the channel bandwidth. This is not limited in this application. The following provides descriptions by using an example in which the network device indicates an offset of the center frequency in the channel bandwidth of the terminal relative to the location of the upconversion carrier frequency of the terminal to indicate the location of the channel bandwidth of the terminal. When the "center frequency in the channel bandwidth" is replaced with another frequency A in the channel bandwidth, a corresponding method may be obtained: The network device may indicate an offset of the frequency A in the channel bandwidth of the terminal relative to the location of the upconversion carrier frequency of the terminal, to indicate the location of the channel bandwidth of the terminal.

The network device may indicate the offset of the center frequency in the channel bandwidth of the terminal relative to the location of the upconversion carrier frequency of the terminal, to indicate the location of the channel bandwidth of the terminal. The terminal may determine the center frequency in the channel bandwidth of the terminal based on the offset and the location of the upconversion carrier frequency of the terminal, to determine the location of the channel bandwidth of the terminal. When the terminal determines the center frequency in the channel bandwidth of the terminal, for example, a frequency value of the center frequency in the channel bandwidth of the terminal plus a frequency corresponding to the offset is equal to the upconversion carrier frequency of the terminal, or a frequency value of the center frequency in the channel bandwidth of the terminal minus a frequency corresponding to the offset is equal to the upconversion carrier frequency of the terminal.

In the embodiments of this application, the location of the upconversion carrier frequency of the terminal may be preconfigured, or may be indicated by the network device to the terminal by using signaling. A manner of determining the location of the upconversion carrier frequency of the terminal is not limited in this application. For example, the manner of determining the location of the upconversion carrier frequency of the terminal may be a manner specified in a 5G protocol specification (for example, the protocol TS 38.211, or a protocol combining the protocol TS 38.211 and other 38-series protocols) formulated by the 3rd generation partnership project (3GPP), or a manner discussed in a 3GPP standard proposal.

For example, the first information includes the offset of the center frequency in the channel bandwidth of the terminal relative to the location of the upconversion carrier frequency of the terminal.

The offset of the center frequency in the channel bandwidth of the terminal relative to the location of the upconversion carrier frequency of the terminal may be measured in hertz or in a form of resource units. The resource unit may be a subcarrier, an RB, a global frequency raster, a channel raster, or the like. This is not limited in this application.

In a possible implementation, the offset of the center frequency in the channel bandwidth of the terminal relative to the location of the upconversion carrier frequency of the terminal is $SC_{offset}$ subcarriers or RBs, where $SC_{offset}$ is an integer. In the embodiments of this application, the integer may be −1, −2, −3, or another negative integer less than −3, may be 0, or may be 1, 2, 3, or another positive integer greater than 3. This is not limited in this application.

A subcarrier spacing corresponding to the $SC_{offset}$ subcarriers or RBs may be a preconfigured subcarrier spacing. For example, for a band less than or equal to 6 GHz, the subcarrier spacing corresponding to the $SC_{offset}$ subcarriers or RBs may be preset to 15 kHz. For another example, for a band greater than 6 GHz, the subcarrier spacing corresponding to the $SC_{offset}$ subcarriers or RBs may be preset to 60 kHz.

The subcarrier spacing corresponding to the $SC_{offset}$ subcarriers or RBs may be a minimum or maximum subcarrier spacing configured on a carrier, or may be a minimum or maximum subcarrier spacing configurable on a carrier.

In the embodiments of this application, a subcarrier spacing configured on a carrier may be a subcarrier spacing actually configured on the carrier, or a subcarrier spacing that has been configured on the carrier. A subcarrier spacing configurable on a carrier may be a candidate subcarrier spacing on the carrier or a subcarrier spacing supported by the carrier. The subcarrier spacing configured on the carrier may be included in the subcarrier spacing configurable on the carrier. A subcarrier spacing configurable on a carrier may be actually configured as a subcarrier spacing configured on the carrier. The minimum subcarrier spacing configured on the carrier may be a minimum value in subcarrier spacings actually configured on the carrier. The minimum subcarrier spacing configurable on the carrier may be a minimum value in candidate subcarrier spacings on the carrier. The maximum subcarrier spacing configured on the carrier may be a maximum value in subcarrier spacings actually configured on the carrier. The maximum subcarrier spacing configurable on the carrier may be a maximum value in candidate subcarrier spacings on the carrier. For example, the subcarrier spacings configurable on the carrier or the candidate subcarrier spacings on the carrier include 15 kHz, 30 kHz, 60 kHz, 120 kHz, 240 kHz, and 480 kHz. In this case, the minimum subcarrier spacing configurable on the carrier is 15 kHz, and the maximum subcarrier spacing configurable on the carrier is 480 kHz. One or more of the subcarrier spacings configurable on the carrier may be actually configured as the subcarrier spacing configured on the carrier. If the subcarrier spacings actually configured on the carrier include 30 kHz and 60 kHz, the minimum subcarrier spacing configured on the carrier is 30 kHz, and the maximum subcarrier spacing configured on the carrier is 60 kHz.

The subcarrier spacing corresponding to the $SC_{offset}$ subcarriers or RBs may alternatively be configured by the network device for the terminal by using signaling. For example, the network device sends third information to the terminal. The third information is used to indicate the subcarrier spacing corresponding to the $SC_{offset}$ subcarriers or RBs.

In a possible implementation, the offset of the center frequency in the channel bandwidth of the terminal relative to the location of the upconversion carrier frequency of the terminal is $Rs_{offset}$ global frequency rasters or $Rs_{offset}$ channel rasters, where $Rs_{offset}$ an integer.

The following specifically describes the fifth implementation.

The network device may indicate an offset of a frequency in the channel bandwidth of the terminal relative to the center subcarrier in the resource grid, to indicate the location of the channel bandwidth of the terminal. The frequency in the channel bandwidth of the terminal may be a center frequency in the channel bandwidth, a lowest frequency in the channel bandwidth, a highest frequency in the channel bandwidth, or any frequency in the channel bandwidth. This is not limited in this application. Further, in the method, the center subcarrier in the resource grid may alternatively be extended to or replaced with any location or any subcarrier in the resource grid, for example, a lowest frequency or a subcarrier with a lowest frequency in the resource grid, or a highest frequency or a subcarrier with a highest frequency in the resource grid. This is not limited in this application. The following provides descriptions by using an example in which the network device indicates an offset of the center frequency in the channel bandwidth of the terminal relative to the center subcarrier in the resource grid to indicate the location of the channel bandwidth of the terminal. When the "center frequency in the channel bandwidth" is replaced with another frequency A in the channel bandwidth, a corresponding method may be obtained: The network device indicates an offset of the frequency A in the channel bandwidth of the terminal relative to the center subcarrier in the resource grid, to indicate the location of the channel bandwidth of the terminal.

The network device may indicate the offset of the center frequency in the channel bandwidth of the terminal relative to the center subcarrier in the resource grid, to indicate the location of the channel bandwidth of the terminal. The terminal may determine the center frequency in the channel bandwidth of the terminal based on the offset and a location of the center subcarrier in the resource grid, to determine the location of the channel bandwidth of the terminal. When the terminal determines the center frequency in the channel bandwidth of the terminal, for example, a frequency value of the center frequency in the channel bandwidth of the terminal plus a frequency corresponding to the offset is equal to the offset relative to the center subcarrier in the resource grid, or a frequency value of the center frequency in the channel bandwidth of the terminal minus a frequency corresponding to the offset is equal to the offset relative to the center subcarrier in the resource grid.

In the embodiments of this application, the location of the center subcarrier in the resource grid may be a location of the resource grid or may be determined by using a location of the resource grid. The location of the resource grid may be preconfigured, or may be indicated by the network device to the terminal by using signaling. A manner of determining the location of the resource grid is not limited in this application. For example, the manner of determining the location of the resource grid may be a manner specified in a 5G protocol specification (for example, the protocol TS 38.211, or a protocol combining the protocol TS 38.211 and other 38-series protocols) formulated by 3GPP, or a manner discussed in a 3GPP standard proposal. For example, the resource grid includes a total of $N_{grid}^{size}$ RBs: an RB 0 to an RB $N_{grid}^{size}-1$. Each RB includes a total of 12 subcarriers: a subcarrier 0 to a subcarrier 11. When $N_{grid}^{size}$ is an even number, in other words, when $N_{grid}^{size} \bmod 2=0$, an index of an RB in which the center subcarrier in the resource grid is located is $$\left\lfloor \frac{N_{grid}^{size}}{2} \right\rfloor,$$

and a subcarrier index, of the center subcarrier in the resource grid, in the RB is 0. When $N_{grid}^{size}$ is an odd number, in other words, when $N_{grid}^{size} \bmod 2=1$, an index of an RB in which the center subcarrier in the resource grid is located is $$\left\lfloor \frac{N_{grid}^{size}}{2} \right\rfloor,$$

and a subcarrier index, of the center subcarrier in the resource grid, in the RB is 6.

For example, the first information includes the offset of the center frequency in the channel bandwidth of the terminal relative to the center subcarrier in the resource grid.

The offset of the center frequency in the channel bandwidth of the terminal relative to the center subcarrier in the resource grid may be measured in hertz or in a form of resource units. The resource unit may be a subcarrier, an RB, a global frequency raster, a channel raster, or the like. This is not limited in this application.

In a possible implementation, the offset of the center frequency in the channel bandwidth of the terminal relative to the center subcarrier in the resource grid is $Rs_{offset}^{RB}$ global frequency rasters or $Rs_{offset}^{RB}$ channel rasters, where $Rs_{offset}^{RB}$ is an integer.

In a possible implementation, the offset of the center frequency in the channel bandwidth of the terminal relative to the center subcarrier in the resource grid is $SC_{offset}^{RB}$ subcarriers or RBs. $SC_{offset}^{RB}$ is an integer, and a subcarrier spacing corresponding to the $SC_{offset}^{RB}$ subcarriers or RBs is a subcarrier spacing corresponding to the resource grid. The subcarrier spacing corresponding to the resource grid may be a preconfigured subcarrier spacing. For example, for a band less than or equal to 6 GHz, the subcarrier spacing corresponding to the resource grid is preset to 15 kHz. For another example, for a band greater than 6 GHz, the subcarrier spacing corresponding to the resource grid is preset to 60 kHz.

The subcarrier spacing corresponding to the resource grid may alternatively be a minimum subcarrier spacing configured on a carrier, a minimum subcarrier spacing configurable on a carrier, a maximum subcarrier spacing configured on a carrier, or a maximum subcarrier spacing configurable on a carrier.

The subcarrier spacing corresponding to the resource grid may alternatively be configured by the network device for the terminal by using signaling. For example, the network device sends fourth information to the terminal. The fourth information is used to indicate the subcarrier spacing corresponding to the resource grid.

An embodiment of this application further provides a data transmission method, to determine a location of a channel bandwidth of a terminal. The method includes: performing, by a network device, data transmission with a terminal by using a resource in a channel bandwidth of the terminal, where a center frequency in the channel bandwidth of the terminal is aligned with a center subcarrier in a resource grid. The data transmission may be that the network device sends data to the terminal, or the terminal sends data to the network device. This is not limited in this application. In the method, alignment of the center frequency in the channel bandwidth of the terminal and the center subcarrier in the resource grid is preconfigured, so that after determining a location of the resource grid, the terminal uses a location of the center subcarrier in the resource grid as a location of the center frequency in the channel bandwidth of the terminal, thereby determining a location of the channel bandwidth of the terminal.

Optionally, in the method, the center subcarrier in the resource grid may alternatively be extended to or replaced with any location or any subcarrier in the resource grid, for example, a lowest frequency or a subcarrier with a lowest frequency in the resource grid, or a highest frequency or a subcarrier with a highest frequency in the resource grid. This is not limited in this application.

Optionally, in the method, the center frequency in the channel bandwidth may alternatively be extended to or replaced with any location in the channel bandwidth, for example, a lowest frequency in the channel bandwidth, a highest frequency in the channel bandwidth, or another frequency in the channel bandwidth. This is not limited in this application.

In a possible implementation, if a resource grid size corresponding to a minimum subcarrier spacing is the same as a maximum transmission bandwidth configuration corresponding to the minimum subcarrier spacing, a subcarrier spacing corresponding to the resource grid in which the center subcarrier is aligned with the center frequency in the channel bandwidth is the minimum subcarrier spacing. The minimum subcarrier spacing is a minimum subcarrier spacing configured on a carrier or a minimum subcarrier spacing configurable on a carrier. The resource grid may be measured in a form of RBs, and the resource grid size may alternatively be described as RBs included in the resource grid.

Figure 18:
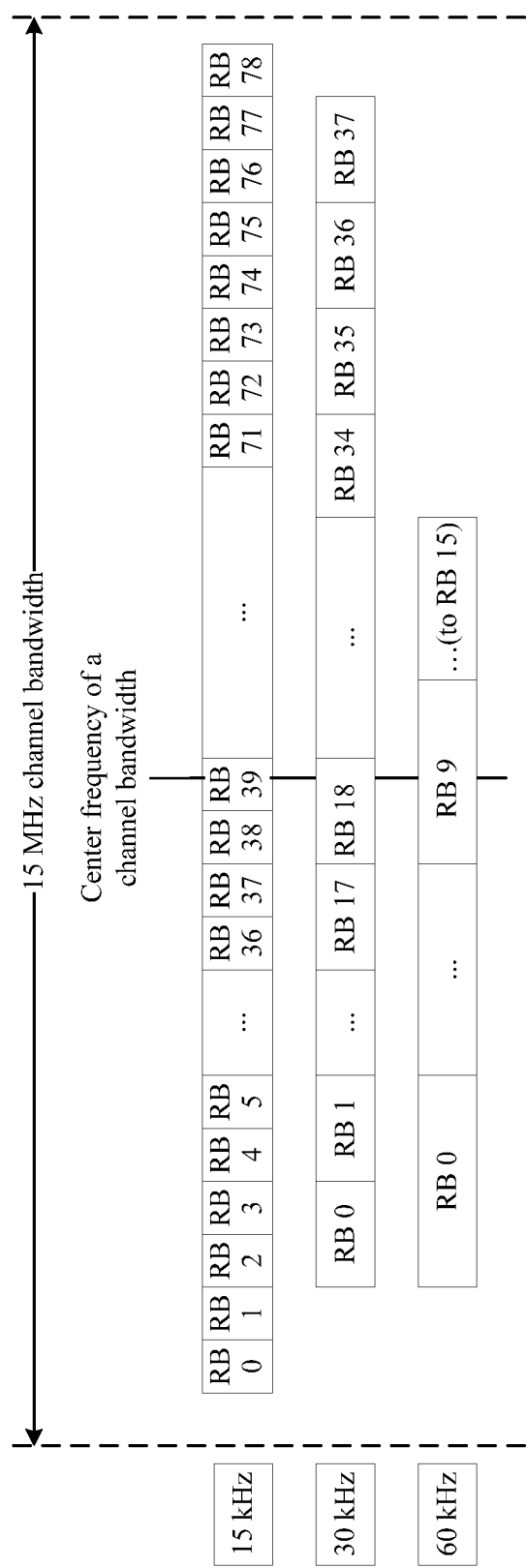
FIG. 18 is a schematic diagram of a resource grid according to an embodiment of this application.

For example, subcarrier spacings configured on a carrier or subcarrier spacings configurable on a carrier include 15 kHz, 30 kHz, and 60 kHz, and a minimum subcarrier spacing is 15 kHz. If the channel bandwidth of the terminal is 15 MHz, a maximum transmission bandwidth configuration corresponding to 15 kHz is 79 RBs, a maximum transmission bandwidth configuration corresponding to 30 kHz is 38 RBs, and a maximum transmission bandwidth configuration corresponding to 60 kHz is 16 RBs. For a resource grid shown in FIG. 18, if a resource grid size corresponding to 15 kHz is 79 RBs, where the 79 RBs are an RB 0 to an RB 78 that are corresponding to 15 kHz in FIG. 18, in other words, if the resource grid size corresponding to the minimum subcarrier spacing is the same as the maximum transmission bandwidth configuration corresponding to the minimum subcarrier spacing, the subcarrier spacing corresponding to the resource grid is 15 kHz, in other words, the center frequency in the channel bandwidth of the terminal is aligned with a center subcarrier in the resource grid corresponding to the 15 kHz subcarrier spacing. In other words, the center frequency in the channel bandwidth is aligned with a center subcarrier in the RB 39 of 15 kHz.

In a possible design, if a resource grid size corresponding to a minimum subcarrier spacing is different from a maximum transmission bandwidth configuration corresponding to the minimum subcarrier spacing, a subcarrier spacing corresponding to the resource grid in which the center subcarrier is aligned with the center frequency in the channel bandwidth is a first subcarrier spacing, where a product of the first subcarrier spacing and a resource grid size corresponding to the first subcarrier spacing is greater than or equal to a product of a second subcarrier spacing and a resource grid size corresponding to the second subcarrier spacing, and the second subcarrier spacing and the first subcarrier spacing are subcarrier spacings configured on a carrier, or the second subcarrier spacing and the first subcarrier spacing are subcarrier spacings configurable on a carrier. The solution may alternatively be described as: If a resource grid size corresponding to a minimum subcarrier spacing is different from a maximum transmission bandwidth configuration corresponding to the minimum subcarrier spacing, a subcarrier spacing corresponding to the resource grid is a first subcarrier spacing, where a product of the first subcarrier spacing and a resource grid size corresponding to the first subcarrier spacing is greater than or equal to a product of a resource grid size corresponding to another subcarrier spacing and the another subcarrier spacing, and the another subcarrier spacing is a subcarrier spacing configured on a carrier or a subcarrier spacing configurable on a carrier.

For example, subcarrier spacings configured on a carrier or subcarrier spacings configurable on a carrier include 15 kHz, 30 kHz, and 60 kHz, and a minimum subcarrier spacing is 15 kHz. If the channel bandwidth of the terminal is 15 MHz, a maximum transmission bandwidth configuration corresponding to 15 kHz is 79 RBs, a maximum transmission bandwidth configuration corresponding to 30 kHz is 38 RBs, and a maximum transmission bandwidth configuration corresponding to 60 kHz is 18 RBs. If resource grids corresponding to 15 kHz, 30 kHz, and 60 kHz are respectively 50 RBs, 30 RBs, and 16 RBs, a resource grid size corresponding to the minimum subcarrier spacing is different from a maximum transmission bandwidth configuration corresponding to the minimum subcarrier spacing. For 15 kHz, 30 kHz, and 60 kHz, products of resource grid sizes and subcarrier spacings are respectively 750 (15 kHz multiplying 50), 900 (30 kHz multiplying 30), and 960 (60 kHz multiplying 16). Because 960 is greater than 750 and 900, the center frequency in the channel bandwidth of the terminal is aligned with a center subcarrier in the resource grid corresponding to the 60 kHz subcarrier spacing.

In a possible design, if a resource grid size corresponding to a minimum subcarrier spacing is different from a maximum transmission bandwidth configuration corresponding to the minimum subcarrier spacing, a subcarrier spacing corresponding to the resource grid in which the center subcarrier is aligned with the center frequency in the channel bandwidth is a first subcarrier spacing, where a product of the first subcarrier spacing and a resource grid size corresponding to the first subcarrier spacing is less than a product of a second subcarrier spacing and a resource grid size corresponding to the second subcarrier spacing, and the second subcarrier spacing and the first subcarrier spacing are subcarrier spacings configured on a carrier, or the second subcarrier spacing and the first subcarrier spacing are subcarrier spacings configurable on a carrier.

In a possible implementation, if a resource grid size corresponding to a maximum subcarrier spacing is the same as a maximum transmission bandwidth configuration corresponding to the maximum subcarrier spacing, a subcarrier spacing corresponding to the resource grid in which the center subcarrier is aligned with the center frequency in the channel bandwidth is the maximum subcarrier spacing. The maximum subcarrier spacing is a maximum subcarrier spacing configured on a carrier or a maximum subcarrier spacing configurable on a carrier.

In a possible implementation, if a resource grid size corresponding to a maximum subcarrier spacing is different from a maximum transmission bandwidth configuration corresponding to the maximum subcarrier spacing, a subcarrier spacing corresponding to the resource grid in which the center subcarrier is aligned with the center frequency in the channel bandwidth is a first subcarrier spacing, where a product of the first subcarrier spacing and a resource grid size corresponding to the first subcarrier spacing is greater than or equal to a product of a second subcarrier spacing and a resource grid size corresponding to the second subcarrier spacing, and the second subcarrier spacing and the first subcarrier spacing are subcarrier spacings configured on a carrier, or the second subcarrier spacing and the first subcarrier spacing are subcarrier spacings configurable on a carrier.

In a possible implementation, if a resource grid size corresponding to a maximum subcarrier spacing is different from a maximum transmission bandwidth configuration corresponding to the maximum subcarrier spacing, a subcarrier spacing corresponding to the resource grid in which the center subcarrier is aligned with the center frequency in the channel bandwidth is a first subcarrier spacing, where a product of the first subcarrier spacing and a resource grid size corresponding to the first subcarrier spacing is less than a product of a second subcarrier spacing and a resource grid size corresponding to the second subcarrier spacing, and the second subcarrier spacing and the first subcarrier spacing are subcarrier spacings configured on a carrier, or the second subcarrier spacing and the first subcarrier spacing are subcarrier spacings configurable on a carrier.

In a possible implementation, a subcarrier spacing corresponding to the resource grid in which the center subcarrier is aligned with the center frequency in the channel bandwidth is a minimum subcarrier spacing configured on a carrier or a minimum subcarrier spacing configurable on a carrier, or a subcarrier spacing corresponding to the resource grid is a maximum subcarrier spacing configured on a carrier or a maximum subcarrier spacing configurable on a carrier.

In a possible implementation, a subcarrier spacing corresponding to the resource grid in which the center subcarrier is aligned with the center frequency in the channel bandwidth is a preconfigured subcarrier spacing. For example, for a band less than or equal to 6 GHz, the preconfigured subcarrier spacing is 15 kHz. For another example, for a band greater than 6 GHz, the preconfigured subcarrier spacing is 60 kHz.

In a possible implementation, a subcarrier spacing corresponding to the resource grid in which the center subcarrier is aligned with the center frequency in the channel bandwidth may alternatively be configured by the network device for the terminal by using signaling. For example, the network device sends fifth information to the terminal. The fifth information is used to indicate the subcarrier spacing for the resource grid. The center frequency in the channel bandwidth is aligned with a center subcarrier in the resource grid.

Based on any embodiment of this application, a plurality of BWPs may be configured, to correspond to one channel bandwidth of a terminal or a plurality of channel bandwidths of a terminal. When the plurality of BWPs are corresponding to a plurality of channel bandwidths, for a bandwidth of each BWP, the network device notifies both locations of the channel bandwidths of the terminal and values of the channel bandwidths of the terminal. The network device may notify the locations of the channel bandwidths of the terminal and the values of the channel bandwidths of the terminal by using different information fields in signaling or by using different signaling, or the locations of the channel bandwidths of the terminal and the values of the channel bandwidths of the terminal may be implicitly determined through predefining. For details about how to notify the locations of the channel bandwidths of the terminal, any one of the first implementation to the third implementation may be used. Details are not described herein.

For example, the following three BWPs are configured for the terminal: a BWP 0 that is equal to six RBs, a BWP 1 that is equal to 25 RBs, and a BWP 2 that is equal to 75 RBs. The following five values of channel bandwidths of the terminal can be used by each BWP: 1.4 MHz, 3 MHz, 5 MHz, 10 MHz, and 15 MHz.

Using the third implementation as an example, for the BWP 0 that is equal to six RBs, there may be five values of channel bandwidths of the terminal: {1.4 MHz, 3 MHz, 5 MHz, 10 MHz, 15 MHz}, and the three relative location relationships in the third implementation may be used. In this case, there are 5×3=15 combination manners.

For the BWP 1 that is equal to 25 RBs, there may be three values of channel bandwidths of the terminal: {5 MHz, 10 MHz, 15 MHz}, and the three relative location relationships in the third implementation may be used. In this case, there are 3×3=9 combination manners.

For the BWP 2 that is equal to 75 RBs, there may be one value of a channel bandwidth of the terminal: {15 MHz}, and the three relative location relationships in the third implementation may be used. In this case, there are 1×3=3 combination manners.

When the network device notifies the locations of the channel bandwidths of the terminal and the values of the channel bandwidths of the terminal, and different information bits are used for indication, a 4-bit information bit may be used for combined indication. For example, for the BWP 0, 0000 indicates that a 1.4 MHz channel bandwidth of the terminal and the first relative location relationship are used, and 0001 indicates that a 1.4 MHz channel bandwidth of the terminal and the second relative location relationship are used.

When the network device notifies the locations of the channel bandwidths of the terminal and the values of the channel bandwidths of the terminal, and different information bits are used for indication, a most significant bit and a least significant bit may alternatively be used to respectively indicate a used relative location relationship and a value of a channel bandwidth of the terminal. For example, three most significant bits are used to indicate the value of the channel bandwidth of the terminal, and two least significant bits are used to indicate the used relative location relationship.

In the embodiments of this application, the values of the channel bandwidths of the terminal may alternatively not be notified by the network device, but be implicitly determined by the terminal.

A correspondence between values of different channel bandwidths of the terminal and values of different terminal-side transmission configuration bandwidths is configured for both the network device and the terminal. For example, as shown in the following Table 5, a value that is of a terminal-side transmission configuration bandwidth and that is corresponding to a value of one channel bandwidth is a quantity of resource units that can be used for data transmission in the one channel bandwidth.

TABLE 5

| Channel bandwidth 0 of the terminal | Channel bandwidth 1 of the terminal | Channel bandwidth 2 of the terminal | Channel bandwidth 3 of the terminal | Channel bandwidth 4 of the terminal | Channel bandwidth 5 of the terminal |
| --- | --- | --- | --- | --- | --- |
| Terminal-side transmission configuration bandwidth 0 | Terminal-side transmission configuration bandwidth 1 | Terminal-side transmission configuration bandwidth 2 | Terminal-side transmission configuration bandwidth 3 | Terminal-side transmission configuration bandwidth 4 | Terminal-side transmission configuration bandwidth 5 |

The network device sends configuration information of a BWP to the terminal, and the configuration information of the BWP includes a bandwidth value of the BWP. After receiving the configuration information, the terminal determines, based on a configured correspondence (as shown in Table 5), a value of a channel bandwidth, of the terminal, corresponding to the BWP. Specifically, a value of a first channel bandwidth is determined in the configured correspondence. The value of the first channel bandwidth is equal to a minimum value in a first set. Each value that is of a terminal-side transmission configuration bandwidth and that is included in the first set is greater than or equal to the bandwidth size of the BWP. The first channel bandwidth is used as the channel bandwidth, of the terminal, corresponding to the BWP.

For example, for a correspondence between values of different channel bandwidths of the terminal and values of different terminal-side transmission configuration bandwidths, refer to Table 6.

TABLE 6

| $BW_{channel}$ (MHz) | 1.4 | 3 | 5 | 10 | 15 | 20 |
| --- | --- | --- | --- | --- | --- | --- |
| $N_{RB}$ (RB) | 6 | 15 | 25 | 50 | 75 | 100 |

$BW_{channel}$ (MHz) represents a value of a channel bandwidth of the terminal, and $N_{RB}$ represents a value of a terminal-side transmission configuration bandwidth.

Using the correspondence shown in Table 6 as an example, if a value of a bandwidth of a BWP configured by the network device for the terminal is 51 RBs, values of terminal-side transmission configuration bandwidths greater than 51 RBs are 75 RBs and 100 RBs. Therefore, a channel bandwidth corresponding to a minimum value 75 RBs is 15 MHz, and the value of the channel bandwidth corresponding to the BWP is 15 MHz. This configuration may no longer need to be notified to the terminal by the network device when a bandwidth requirement of a BWP is met, thereby saving a transmission resource.

Figure 12:
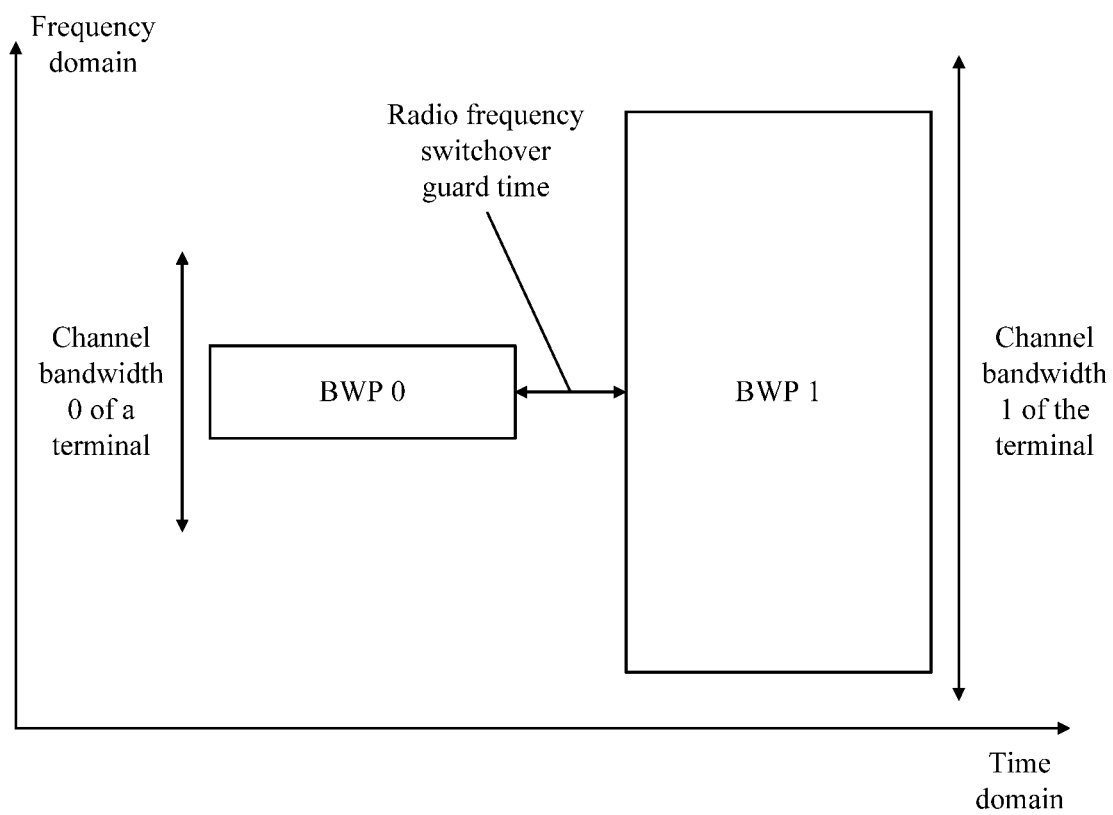
FIG. 12 is a schematic diagram of a BWP switchover according to an embodiment of this application.

A possible scenario to which the BWP configuration can be applied is for energy saving of the terminal. As shown in FIG. 12, that two BWPs: a BWP 0 and a BWP 1, are configured for the terminal is used as an example. Because a bandwidth value of the BWP 1 is greater than a bandwidth value of the BWP 0, a channel bandwidth 1 of the terminal is used as a channel bandwidth, of the terminal, corresponding to the BWP 1, and a channel bandwidth 0 of the terminal is used as a channel bandwidth, of the terminal, corresponding to the BWP 0, where a value of the channel bandwidth 1 of the terminal is greater than a value of the channel bandwidth 0 of the terminal. In a first time unit, the terminal may use only the channel bandwidth 0 of the terminal for the BWP 0. When there is data to be scheduled, the terminal switches to the BWP 1, and a radio frequency of the terminal also switches to the channel bandwidth 1 of the terminal in a radio frequency switchover guard time. Because energy consumption of the terminal increases with a radio frequency bandwidth, when no data is to be scheduled, the terminal uses only the smaller channel bandwidth 0 of the terminal to monitor a physical downlink control channel (PDCCH), thereby reducing energy consumption of the terminal. The radio frequency switchover guard time may be preconfigured by the network device for the terminal, or may be specified by a protocol.

Figure 13:
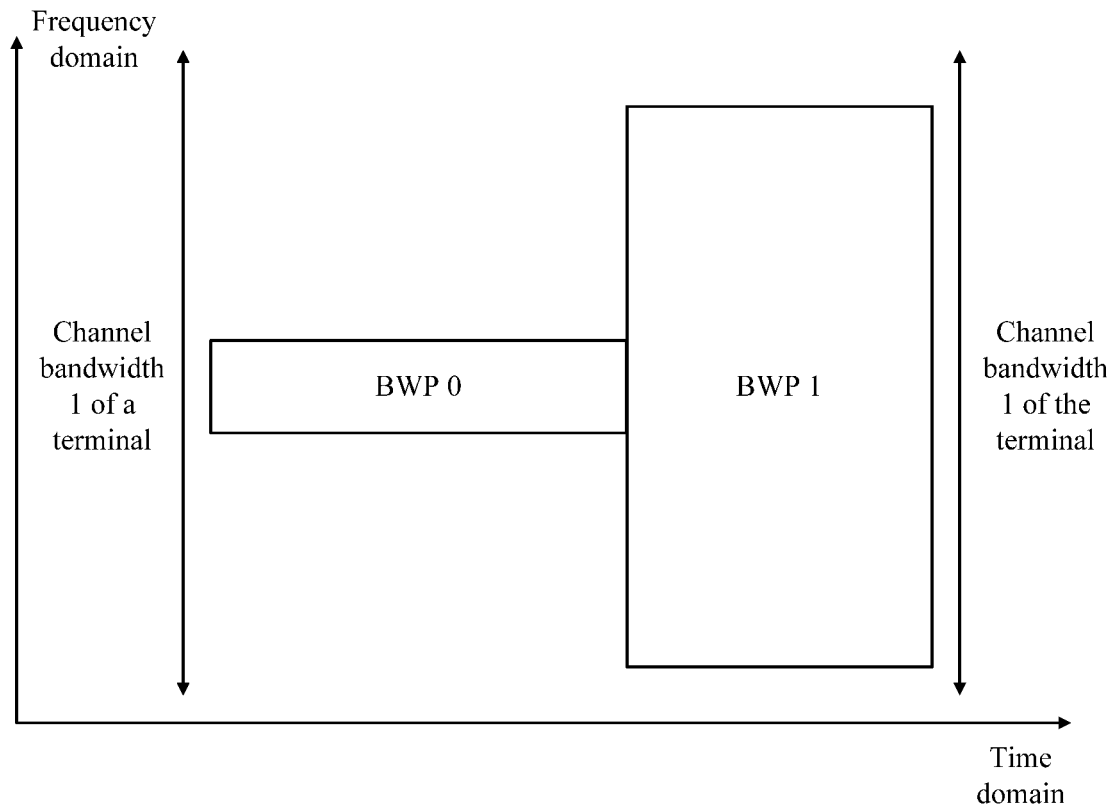
FIG. 13 is a schematic diagram of another BWP switchover according to an embodiment of this application.

In addition, when energy consumption of the terminal is reduced, because there is a radio frequency switchover, the radio frequency switchover guard time needs to be introduced in time domain. However, the terminal cannot send or receive data in the guard time, causing a waste of resources. For some terminals, in some time, frequent introduction of a guard time is not desired to cause a waste of resources, or the terminals do not need energy saving. Based on this, the network device may configure the channel bandwidth 1 of the terminal for both the BWP 0 and the BWP 1 of the terminal, as shown in FIG. 13. This can prevent the radio frequency switchover of the terminal from occupying the guard time to cause a waste of resources.

Based on this, in the solution provided in the embodiments of this application, for different terminals, values of channel bandwidths, of the terminals, corresponding to different BWPs may be configured as required, thereby improving application flexibility of a BWP configuration.

In the embodiments of this application, the method provided in the embodiments of this application is described from perspectives of the network device, the terminal, and interaction between the network device and the terminal. To implement the functions of the method provided in the embodiments of this application, both the network device and the terminal may include a hardware structure and/or a software module, to implement the functions in a form of the hardware structure, the software module, or a combination of the hardware structure and the software module. Whether one of the functions is performed in a form of a hardware structure, a software module, or a combination of a hardware structure and a software module depends on particular applications and design constraints of the technical solutions.

Figure 14:
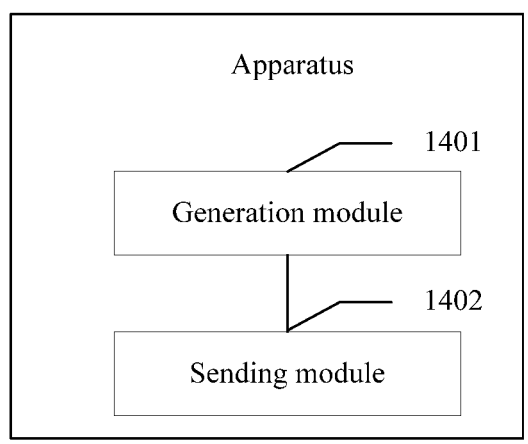
FIG. 14 is a schematic structural diagram of an apparatus according to an embodiment of this application.

Based on the method embodiments corresponding to FIG. 8 to FIG. 13, an embodiment of this application provides an apparatus, configured to implement functions of the network device in the foregoing method. The apparatus may be a network device or an apparatus in a network device. As shown in FIG. 14, the apparatus includes a generation module 1401 and a sending module 1402. The modules may perform corresponding functions performed by the network device in the method embodiments corresponding to FIG. 8 to FIG. 13. The generation module 1401 is configured to generate information such as first information, second information, or configuration information. The sending module 1402 is configured to perform functions of sending the information such as the first information, the second information, or the configuration information. For details, refer to detailed descriptions in the method example. Details are not described herein again.

Module division in the embodiments of this application is an example, and is merely logical function division. There may be another division manner in actual implementation. In addition, functional modules in embodiments of this application may be integrated into one processor, or each of the modules may exist alone physically, or two or more modules are integrated into one module. The integrated module may be implemented in a form of hardware, or may be implemented in a form of a software functional module.

Figure 15:
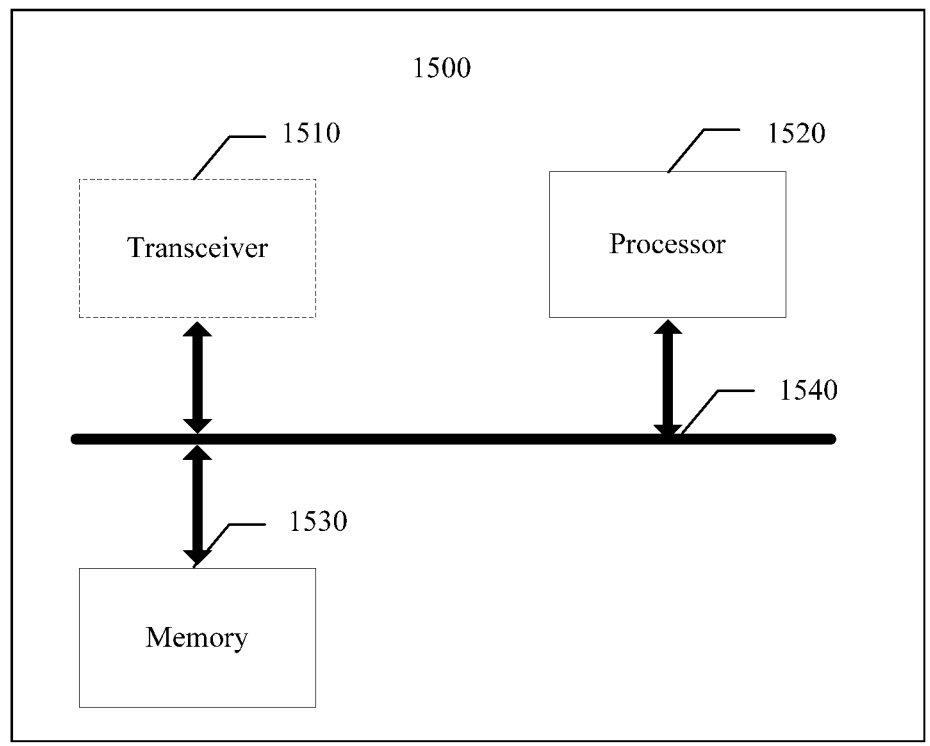
FIG. 15 is a schematic structural diagram of a network device according to an embodiment of this application.

FIG. 15 shows an apparatus 1500 according to an embodiment of this application. The apparatus 1500 is configured to implement functions of the network device in the foregoing method. The apparatus may be a network device or an apparatus in a network device. The apparatus may be a chip system. In the embodiments of this application, the chip system may include a chip, or may include a chip and another discrete device. The apparatus 1500 includes a processor 1520, configured to implement functions of the network device in the method in the embodiments of this application. For example, the processor 1520 may generate and send information such as first information, second information, third information, fourth information, fifth information, or configuration information. For details, refer to detailed descriptions in the method example. Details are not described herein again.

The apparatus 1500 may further include a memory 1530, configured to store a program instruction and/or data. The memory 1530 is coupled to the processor 1520. The coupling in the embodiments of this application is indirect coupling or a communication connection between apparatuses, units, or modules, may be implemented in an electrical manner, a mechanical manner, or another manner, and is used for information exchange between the apparatuses, units, or modules. The processor 1520 may cooperate with the memory 1530. The processor 1520 may execute the program instruction stored in the memory 1530.

The apparatus 1500 may further include a transceiver 1510, configured to communicate with another device by using a transmission medium, so that an apparatus used in the apparatus 1500 may communicate with the another device. For example, the another device may be a terminal. The processor 1520 receives or sends data by using the transceiver 1510, and implements the method performed by the network device in the foregoing method embodiments.

A specific connection medium among the transceiver 1510, the processor 1520, and the memory 1530 is not limited in this embodiment of this application. In this embodiment of this application, the memory 1530, the processor 1520, and the transceiver 1510 are connected by using a bus 1540 in FIG. 15. The bus is denoted by using a bold line in FIG. 15. A manner of connection between other components is merely an example for description, and cannot be construed as a limitation. The bus may be classified into an address bus, a data bus, a control bus, and the like. For ease of denotation, the bus is denoted by only one bold line in FIG. 15. However, it does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed by using a combination of hardware in the processor and a software module.

In the embodiments of this application, the memory may be a non-volatile memory, for example, a hard disk drive (HDD) or a solid-state drive (SSD), or may be a volatile memory, for example, a random-access memory (RAM). The memory is any other medium that can carry or store expected program code in a form of an instruction or a data structure and that can be accessed by a computer, but is not limited thereto.

Figure 16:
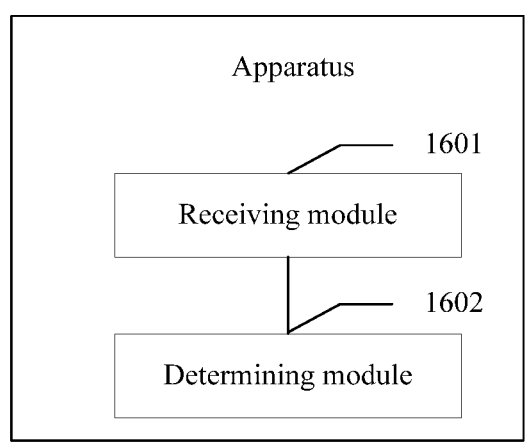
FIG. 16 is a schematic structural diagram of an apparatus according to an embodiment of this application.

Based on the embodiments shown in FIG. 3 to FIG. 13, an embodiment of this application further provides an apparatus, configured to implement functions of the terminal in the foregoing method. The apparatus may be a terminal or an apparatus in a terminal. Referring to FIG. 16, the apparatus includes a receiving module 1601 and a determining module 1602. The receiving module 1601 is configured to receive first information, where the first information is used to indicate a location of a channel bandwidth of the terminal. The determining module 1602 is configured to determine the location of the channel bandwidth of the terminal based on the first information.

Optionally, the receiving module 1601 is further configured to receive second information, where the second information is used to indicate a value of the channel bandwidth of the terminal. The determining module 1602 is configured to determine the value of the channel bandwidth of the terminal based on the second information.

Optionally, the receiving module 1601 is further configured to receive configuration information of a BWP, where the configuration information of the BWP includes a bandwidth value of the BWP. The determining module 1602 is further configured to determine, based on a configured correspondence and the bandwidth value of the BWP, a value of the channel bandwidth, of the terminal, corresponding to the BWP. The configured correspondence is a correspondence between a value of a channel bandwidth of the terminal and a value of a terminal-side transmission configuration bandwidth. A value that is of a configuration bandwidth and that is corresponding to a value of one channel bandwidth is a quantity of resource units that can be used for data transmission in the one channel bandwidth. The value of the channel bandwidth of the terminal is equal to a value of a first channel bandwidth, the value of the first channel bandwidth is equal to a minimum value in a first set, and each value that is of a terminal-side transmission configuration bandwidth and that is included in the first set is greater than or equal to the bandwidth value of the BWP.

Specifically, the receiving module 1601 and the determining module 1602 may perform corresponding functions performed by the terminal in the method embodiments corresponding to FIG. 8 to FIG. 13. Details are not described herein again.

Module division in the embodiments of this application is an example, and is merely logical function division. There may be another division manner in actual implementation. In addition, functional modules in embodiments of this application may be integrated into one processor, or each of the modules may exist alone physically, or two or more modules are integrated into one module. The integrated module may be implemented in a form of hardware, or may be implemented in a form of a software functional module.

Figure 17:
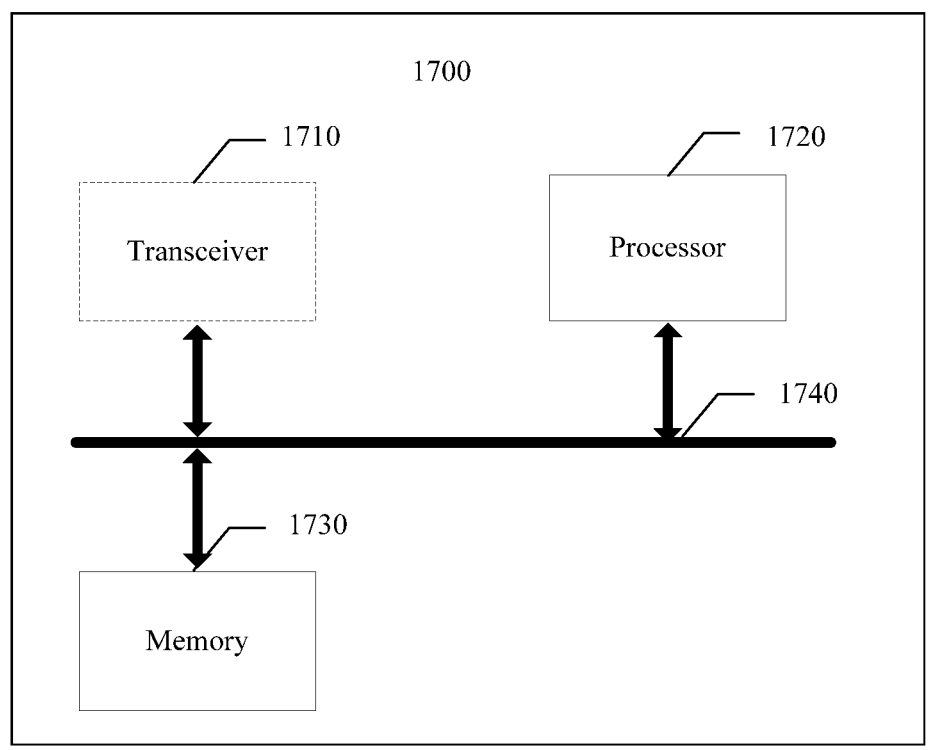
FIG. 17 is a schematic structural diagram of a terminal according to an embodiment of this application.

FIG. 17 shows an apparatus 1700 according to an embodiment of this application. The apparatus 1700 is configured to implement functions of the terminal in the foregoing method. The apparatus may be a terminal or an apparatus in a terminal. The apparatus may be a chip system. In the embodiments of this application, the chip system may include a chip, or may include a chip and another discrete device. The apparatus 1700 includes a processor 1720, configured to implement functions of the terminal in the method provided in the embodiments of this application. For example, the processor 1720 may receive and process information such as first information, second information, third information, fourth information, fifth information, or configuration information. For details, refer to detailed descriptions in the method example. Details are not described herein again.

The apparatus 1700 may further include a memory 1730, configured to store a program instruction and/or data. The memory 1730 is coupled to the processor 1720. The coupling in the embodiments of this application is indirect coupling or a communication connection between apparatuses, units, or modules, may be implemented in an electrical manner, a mechanical manner, or another manner, and is used for information exchange between the apparatuses, units, or modules. The processor 1720 may cooperate with the memory 1730. The processor 1720 may execute the program instruction stored in the memory 1730.

The apparatus 1700 may further include a transceiver 1710, configured to communicate with another device by using a transmission medium, so that an apparatus used in the apparatus 1700 may communicate with the another device. For example, the another device may be a network device. The processor 1720 receives or sends data by using the transceiver 1710, and implements the method performed by the terminal in the foregoing method. In an implementation process, steps of a processing procedure may be implemented by an integrated logical circuit of hardware in the processor 1720 or by a software instruction.

A specific connection medium among the transceiver 1710, the processor 1720, and the memory 1730 is not limited in this embodiment of this application. In this embodiment of this application, the memory 1730, the processor 1720, and the transceiver 1710 are connected by using a bus 1740 in FIG. 17. The bus is denoted by using a bold line in FIG. 17. A manner of connection between other components is merely an example for description, and cannot be construed as a limitation. The bus may be classified into an address bus, a data bus, a control bus, and the like. For ease of denotation, the bus is denoted by only one bold line in FIG. 17. However, it does not mean that there is only one bus or only one type of bus.

All or some of the methods provided in the embodiments of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, a network device, user equipment, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

Apparently, persons skilled in the art can make various modifications and variations to this application without departing from the scope of this application. In this way, this application is intended to cover these modifications and variations of this application provided that they fall within the scope of protection defined by the following claims and their equivalent technologies.

What is claimed is:

1. A method, comprising:
   receiving, by a device, first information, the first information indicating, in a frequency domain, an offset between a $n^{th}$ resource unit in a carrier and a reference resource unit, the carrier being a radio frequency bandwidth, and the radio frequency bandwidth comprising an uplink transmission resource or a downlink transmission resource; and
   determining, by the device, a location of the carrier according to the first information;
   wherein:
   n is a positive integer less than or equal to M, and M is a quantity of resource units in the carrier; and
   the reference resource unit is a predefined resource unit or a reference point of a bandwidth part (BWP) for a terminal, and the BWP for the terminal comprises contiguous frequency-domain resources in the carrier;
   wherein:
   n is equal to 1;
   n is equal to M;
   when M is an even number, n is equal to M/2 or M/2+1; or
   when M is an odd number, n is equal to (M+1)/2.

2. The method according to claim 1, wherein the reference resource unit is a $q^{th}$ resource unit in the BWP for the terminal, wherein q is an integer less than or equal to Q, and Q is a quantity of resource units in the BWP for the terminal.

3. The method according to claim 2, wherein:
   q is equal to 1;
   q is equal to Q;
   when Q is an even number, q is equal to Q/2 or Q/2+1; or
   when Q is an odd number, q is equal to (Q+pro1)/2.

4. An apparatus, comprising:
   a non-transitory memory configured to store a program instruction; and
   at least one processor configured to invoke and execute the program instruction stored in the non-transitory memory, to implement the following operations:
      sending first information, the first information indicating, in a frequency domain, an offset between a $n^{th}$ resource unit in a carrier and a reference resource unit, the carrier being a radio frequency bandwidth, and the radio frequency bandwidth comprising an uplink transmission resource or a downlink transmission resource;
   wherein:
   n is a positive integer less than or equal to M, and M is a quantity of resource units in the carrier; and
   the reference resource unit is a predefined resource unit or a reference point of a bandwidth part (BWP) for a terminal, and the BWP for the terminal comprises contiguous frequency-domain resources in the carrier;
   wherein:
   n is equal to 1;
   n is equal to M;
   when M is an even number, n is equal to M/2 or M/2+1; or
   when M is an odd number, n is equal to (M+1)/2.

5. The apparatus according to claim 4, wherein the reference resource unit is a $q^{th}$ resource unit in the BWP for the terminal, wherein q is an integer less than or equal to Q, and Q is a quantity of resource units in the BWP for the terminal.

6. An apparatus, comprising:
   a non-transitory memory configured to store a program instruction; and
   at least one processor configured to invoke and execute the program instruction stored in the non-transitory memory, to implement the following operations:
      receiving first information, the first information indicating, in a frequency domain, an offset between a $n^{th}$ resource unit in a carrier and a reference resource unit, the carrier being a radio frequency bandwidth, and the radio frequency bandwidth comprising an uplink transmission resource or a downlink transmission resource; and
   determining a location of the carrier according to the first information;
   wherein:
   n is a positive integer less than or equal to M, and M is a quantity of resource units in the carrier; and
   the reference resource unit is a predefined resource unit or a reference point of a bandwidth part (BWP) for a terminal, and the BWP for the terminal comprises contiguous frequency-domain resources in the carrier;
   wherein:
   n is equal to 1;
   n is equal to M;
   when M is an even number, n is equal to M/2 or M/2+1; or
   when M is an odd number, n is equal to (M+1)/2.

7. The apparatus according to claim 6, wherein the reference resource unit is a $q^{th}$ resource unit in the BWP for the terminal, wherein q is an integer less than or equal to Q, and Q is a quantity of resource units in the BWP for the terminal.

8. The apparatus according to claim 7, wherein:
q is equal to 1;
q is equal to Q;
when Q is an even number, q is equal to Q/2 or Q/2+1; or
when Q is an odd number, q is equal to (Q+1)/2.

9. A method, comprising:
sending, by a device, first information, the first information indicating, in a frequency domain, an offset between a $n^{th}$ resource unit in a carrier and a reference resource unit, the carrier being a radio frequency bandwidth, and the radio frequency bandwidth comprising an uplink transmission resource or a downlink transmission resource;
wherein:
n is a positive integer less than or equal to M, and M is a quantity of resource units in the carrier; and
the reference resource unit is a predefined resource unit or a reference point of a bandwidth part (BWP) for a terminal, and the BWP for the terminal comprises contiguous frequency-domain resources in the carrier;
wherein:
n is equal to 1;
n is equal to M;
when M is an even number, n is equal to M/2 or M/2+1; or
when M is an odd number, n is equal to (M+1)/2.

10. The method according to claim 9, wherein the reference resource unit is a $q^{th}$ resource unit in the BWP for the terminal, wherein q is an integer less than or equal to Q, and Q is a quantity of resource units in the BWP for the terminal.

* * * * *